United States Patent
Law et al.

(10) Patent No.: US 8,931,953 B2
(45) Date of Patent: Jan. 13, 2015

(54) LOW VOLTAGE LOW POWER CMOS TEMPERATURE SENSOR CIRCUIT

(75) Inventors: Man Kay Law, Hong Kong (CN); Amine Bermak, Hong Kong (CN); Howard Cam Luong, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 758 days.

(21) Appl. No.: 13/117,884

(22) Filed: May 27, 2011

(65) Prior Publication Data

US 2011/0291807 A1    Dec. 1, 2011

Related U.S. Application Data

(60) Provisional application No. 61/344,123, filed on May 27, 2010.

(51) Int. Cl.
*G01K 7/01* (2006.01)
*G06K 19/07* (2006.01)

(52) U.S. Cl.
CPC .............. *G06K 19/0717* (2013.01); *G01K 7/01* (2013.01); *G06K 19/0723* (2013.01)
USPC ............................ 374/178; 374/100; 340/10.1

(58) Field of Classification Search
USPC ................................. 374/178, 100; 340/10.1
See application file for complete search history.

(56) References Cited

U.S. PATENT DOCUMENTS

| | | | |
|---|---|---|---|
| 5,835,553 A | 11/1998 | Suzuki | |
| 6,421,626 B1 | 7/2002 | Yin | |
| 6,489,831 B1 | 12/2002 | Matranga et al. | |
| 6,531,911 B1 | 3/2003 | Hsu et al. | |
| 6,876,250 B2 | 4/2005 | Hsu et al. | |
| 7,145,380 B2 | 12/2006 | Hsu | |
| 7,461,972 B2 | 12/2008 | Cohen | |
| 2010/0141329 A1* | 6/2010 | Kim | 327/513 |
| 2011/0291807 A1* | 12/2011 | Law et al. | 340/10.1 |

OTHER PUBLICATIONS

Cho et al., "A 5.1-μW UHF RFID Tag Chip integrated with Sensors for Wireless Environmental Monitoring," Proceedings of 31st European Solid State Circuits Conference (ESSCIRC), 279-282 (Grenoble, France, Sep. 12-16, 2005).

(Continued)

*Primary Examiner* — Lisa Caputo
*Assistant Examiner* — Jamel Williams
(74) *Attorney, Agent, or Firm* — Leydig, Voit & Mayer, Ltd.

(57) ABSTRACT

The present invention provides an ultra-low power embedded CMOS temperature sensor based on serially connected subthreshold MOS operation particularly well suited for passive RFID food monitoring applications. Employing serially connected subthreshold MOS as sensing element enables reduced minimum supply voltage for further power reduction, which is very important in passive RFID applications. The temperature sensor may be part of a passive RFID tag and incorporates a temperature sensor core, proportional-to-absolute-temperature (PTAT) and complimentary-to-absolute-temperature (CTAT) delay generators, and a time-to-digital differential readout circuit. In one embodiment, the sensor is embedded inside a passive UHF RFID tag fabricated with a conventional 0.18 μm 1P6M CMOS process. With the sensor core working under 0.5 V and digital interfacing under 1 V, the sensor dissipates a measured total power of 119 nW at 33 samples/s and achieves an inaccuracy of +1/−0.8° C. from −10° C. to 30° C. after calibration.

20 Claims, 14 Drawing Sheets

(56) References Cited

OTHER PUBLICATIONS

Law et al. "A Sub-µW Embedded CMOS Temperature Sensor for RFID Food Monitoring Application," IEEE Journal of Solid-State Physics, 45 (6): 1246-1255 (Jun. 2010).

Lin et al., "An Ultra Low Power 1V, 220nW Temperature Sensor for Passive Wireless Applications," IEEE 2008 Custom Integrated Circuits Conference (CICC), 507-510 (San Jose, California, USA, Sep. 21-24, 2008).

Opasjumruskit et al., "Self-Powered Wireless Temperature Sensors Exploit RFID Technology," IEEE Pervasive Computing, 5: 54-61 (Jan. 2005).

Sebastiano et al., "A 1.2V 10µW NPN-Based Temperature Sensor in 65nm CMOS with an Inaccuracy of ±0.2° C. (3σ) from −70° C. to 125° C.," 2010 IEEE International Solid-State Circuits Conference, 312-313 (San Francisco, California, USA, Feb. 7-11, 2010).

Souri et al., "A CMOS Temperature Sensor with an Energy-Efficient Zoom ADC and an Inaccuracy of ±0.25° C. (3σ) from −40° C. to 125° C.," 2010 IEEE International Solid-State Circuits Conference, 310-311 (San Francisco, California, USA, Feb. 7-11, 2010).

Vaz et al., "Full Passive UHF Tag With a Temperature Sensor Suitable for Human Body Temperature Monitoring," IEEE Transactions on Circuits and Systems—II: Express Briefs, 57 (2): 95-99 (Feb. 2010).

Yin et al., "A System-on-Chip EPC Gen-2 Passive UHF RFID Tag with Embedded Temperature Sensor," 2010 IEEE International Solid-State Circuits Conference, 308-309 (San Francisco, California, USA, Feb. 7-11, 2010).

Szekely et al., "CMOS sensors for on-line thermal monitoring of VLSI circuits," *IEEE Trans. Very Large Scale Integr. (VSLI) Syst.*, vol. 5, No. 3, pp. 270-276, Sep. 1997.

Baalachandran et al., "A 440-nA true random No. generator for passive RFID tags," *IEEE Trans. Circuit Syst. I, Reg. Papers*, vol. 55, No. 11, pp. 3723-3732, Dec. 2008.

Kocer et al., An RF-powered, wireless SMOS temperature sensor, *IEEE Sensor J.*, vol. 6, No. 3, pp. 557-564, Jun. 2006.

Bakker, "CMOS smart temperature sensors-An overview," *Proc. IEEE Sensors*, vol. 2, pp. 1423-1427, Jun. 2002.

Chen et al., "A time-to-digital-converter-based CMOS smart temperature sensor," *IEEE J. Solid-State Circuits*, vol. 40, No. 8, pp. 1642-1648, Aug. 2005.

Opasjumruskit et al., "Self-powered wireless temperature sensor exploit RFID technology," *IEEE Pervasive Computing*, vol. 5, No. 1, pp. 54-61, Jan.-Mar. 2006.

McCullough, M., "Extension Foods and Nutrition: Storage Charts," Kansas State University, Manhattan, KS, Mar. 18, 2005 [online]. Available: http://web.archive.org/web/20070807122450/http://www.oznet.ksu.edu/humannutrition/hrap/storage/stochart.htm.

Corless et al., On the Lambert-W function, *Advances in Computational Mathematics*, vol. 5, pp. 329-359, 1996.

EPC Radio-Frequency Identity Protocols, Class-1 Generation-2 UHF RFID Protocol for Communications at 860 MHz-960 MHz, Version 1.0.9, EPCGlobal, Jan. 2005 [online]. Available: http://www.epcglobalinc.org/standards/uhfc1g2/uhfc1g2_1_0_9_standard-20050126.pdf.

Law et al., A 405-nW CMOS Temperature Sensor Based on Linear MOS Operation, *IEEE Trans. on Circuits and Systems-II: Express Briefs*, 56(12), Dec. 2009.

Law et al., "A Time Domain Differential CMOS Temperature Sensor with Reduced Supply Sensitivity," IEEE, 2008.

\* cited by examiner

700

1000

LOW VOLTAGE LOW POWER CMOS TEMPERATURE SENSOR CIRCUIT

CROSS-REFERENCE TO RELATED APPLICATIONS

This patent application claims the benefit of U.S. Provisional Patent Application No. 61/344,123, filed May 27, 2010, which is incorporated by reference in its entirety.

BACKGROUND OF THE INVENTION

Unlike traditional temperature sensors that utilize offchip components, on-chip CMOS (complementary metal-oxide-semiconductor) temperature sensors are well-known for their benefits of low production cost and ability to interface easily with other electronic circuits. On-chip temperature sensors with small area and low power consumption are normally employed in thermal management applications in order to monitor system reliability and performance as a result of temperature variation.

One popular use of embedded temperature sensors in very-large-scale integration (VLSI) implementations is to monitor excess on-chip heat dissipation resulting from higher and higher levels of integration. On the other hand, the emergence of radio frequency identification (RFID) and wireless sensor network (WSN) applications has given rise to the development of embedded temperature sensors for wireless monitoring systems. For deployment in such applications, power consumption, rather than sensing range and accuracy requirements, is a primary consideration, especially for passive RFID tags. This is because passive RFID tags harvest power through rectification of the incoming RF signal, and the total energy available is limited. Typically, the total current budget for an entire RFID tag may be as low as a few µAs. Thus, the addition of an embedded sensor increases the tag loading, and the tag operating distance will be reduced as a result.

On-chip temperature sensing is conventionally accomplished using BJT devices and digitized using analog-to-digital converters (ADCs). These sensors generally achieve good accuracy but are associated with penalties of increased circuit complexity and chip area. The corresponding power consumption is usually in the µW range and is therefore not suitable for passive RFID tag applications.

The use of delay generated by inverter chains for temperature sensing with time-to-digital converters (TDCs) for digitizing temperature modulated pulse-width has also been implemented. These time domain sensors, though having increased inaccuracy, usually outperform sensors utilizing ADCs in terms of power consumption and area.

In a few recent works, various passive RFID tags embedded with temperature sensors with relatively low power consumptions have been reported. In K. Opasjumruskit et al, "Self-powered Wireless Temperature Sensor Exploit RFID Technology," IEEE Pervasive Computing, vol. 5, issue 1, pp. 54-61, January-March 2006, an on-chip temperature sensor based on BJT architecture with sigma-delta ADC is demonstrated. The tag consumes 2.4 µW and 12 µW (assuming a 1.2V supply) for read and temperature measurement operations, respectively, while achieving an inaccuracy of −1.8° C./+2.2° C. from 0 to 100° C. after calibration at 40° C. In this case, the sensor requires much more power than the rest of the tag, and thus the addition of the sensor can significantly affect normal tag operation.

In N. Cho et al, "A 5.1 uW UHF RFID Tag Chip integrated with Sensors for Wireless Environmental Monitoring," European Solid-State Circuits Conference, pp. 279-282, September 2005, temperature is measured by charging an integrating capacitor up to the temperature-dependent diode voltage $V_{BE}$ through a reference current. The time required is then digitized using a reference clock. The sensor dissipates a total current of 1.6 µW, with a resolution of 0.8° C. and an inaccuracy of ±2.4° C. within the −10 to 80° C. sensing range. Even though the sensor only consumes 1.6 µW, it is still a large amount when compared with the reported tag total power consumption of 5.1 µW.

In Y. Lin et al., "An Ultra Low Power 1V, 220 nW Temperature Sensor for Passive Wireless Applications," IEEE Custom Integrated Circuits Conference, pp. 507-510, September 2008, a standalone temperature sensor with only 220 nW power consumption is reported. In this article, both the temperature-dependent and the reference currents are converted to frequency signals. The sensor exhibits a temperature inaccuracy of −1.61+3° C. from 0° C. to 100° C., while occupying an area of $0.05mm^2$. However, even though sub-µW CMOS temperature sensing is demonstrated, a high supply voltage of 1V is still required for proper sensor operation.

Even with these improvements, existing solutions for embedded ultra-low power temperature sensors in passive RFID tags still consume too much power relative to the limited power available, which greatly reduces the normal tag reading range. As an example, an increase in tag power consumption by 30% through activating the sensor—as in the case of N. Cho et al., "A 5.1 uW UHF RFID Tag Chip integrated with Sensors for Wireless Environmental Monitoring"—can reduce the tag operating distance by almost 20% based on the Friis Transmission Equation (assuming other parameters to be constant).

Embedded temperature sensors should ideally consume power in the sub-microwatt range, so as not to affect the overall tag operation. Based on recent developments in RFID tag technology, overall tag power (and hence the amount of power available to be allocated to a temperature sensor) will continue to decrease in the future, accompanied by increases in tag operating distance, making ultra-low power temperature sensing even more important in future designs. While minimizing power consumption is an object underlying certain implementations of the invention, it will be appreciated that the invention is not limited to systems that solve the problems noted herein. Moreover, it will be appreciated that the inventors have created the above body of information for the convenience of the reader; the foregoing is a discussion of problems discovered and/or appreciated by the inventors, and is not an attempt to review or catalog the prior art.

BRIEF SUMMARY OF THE INVENTION

The invention provides an ultra-low power integrated temperature sensor for passive UHF (ultra-high frequency) RFID tags. Ultra-low power consumption is achieved through the use of a subthreshold MOS sensor core with time domain readout. The subthreshold MOS sensor core is comprised of serially connected pairs of MOS transistors, and generates proportional-to-absolute-temperature (PTAT) and complementary-to-absolute-temperature (CTAT) voltages for temperature sensing at very low supply voltages (e.g., ~0.5V). The generation of PTAT and CTAT voltages depends on proper transistor sizing.

The sensor core is connected to PTAT and CTAT delay generators and a low voltage time-domain differential readout circuit for reduction of power consumption and SNR (signal-to-noise ratio) improvement. The readout circuit performs an XOR function on the outputs of the PTAT and CTAT delay generators to obtain a temperature modulated pulse width PW, and utilizes a ripple counter to quantize the PW. The system clock of an RFID tag may be utilized as the quantization clock and the supply voltages may be provided by the power management utility of the RFID tag on the system level to further reduce power and area overhead.

In an embodiment, a UHF RFID tag is fabricated with the TSMC (Taiwan Semiconductor Manufacturing Company) 0.18 μm 1P6M CMOS process. The sensor in this embodiment was determined to consume 119 nW with +1/−0.8° C. inaccuracy (measured between −10° C. to 30° C. in steps of 5° C.) at a sampling frequency of 33 samples/s. Thus, the tag is well-suited for the sensing range of −10° C. to 30° C., which is the range corresponding to food quality control and monitoring applications, particularly those related to refrigerated and shelf storage.

Other objects and advantages of the invention will become apparent upon reading the following detailed description and upon reference to the drawings.

BRIEF DESCRIPTION OF THE SEVERAL VIEWS OF THE DRAWING(S)

Figure 4:
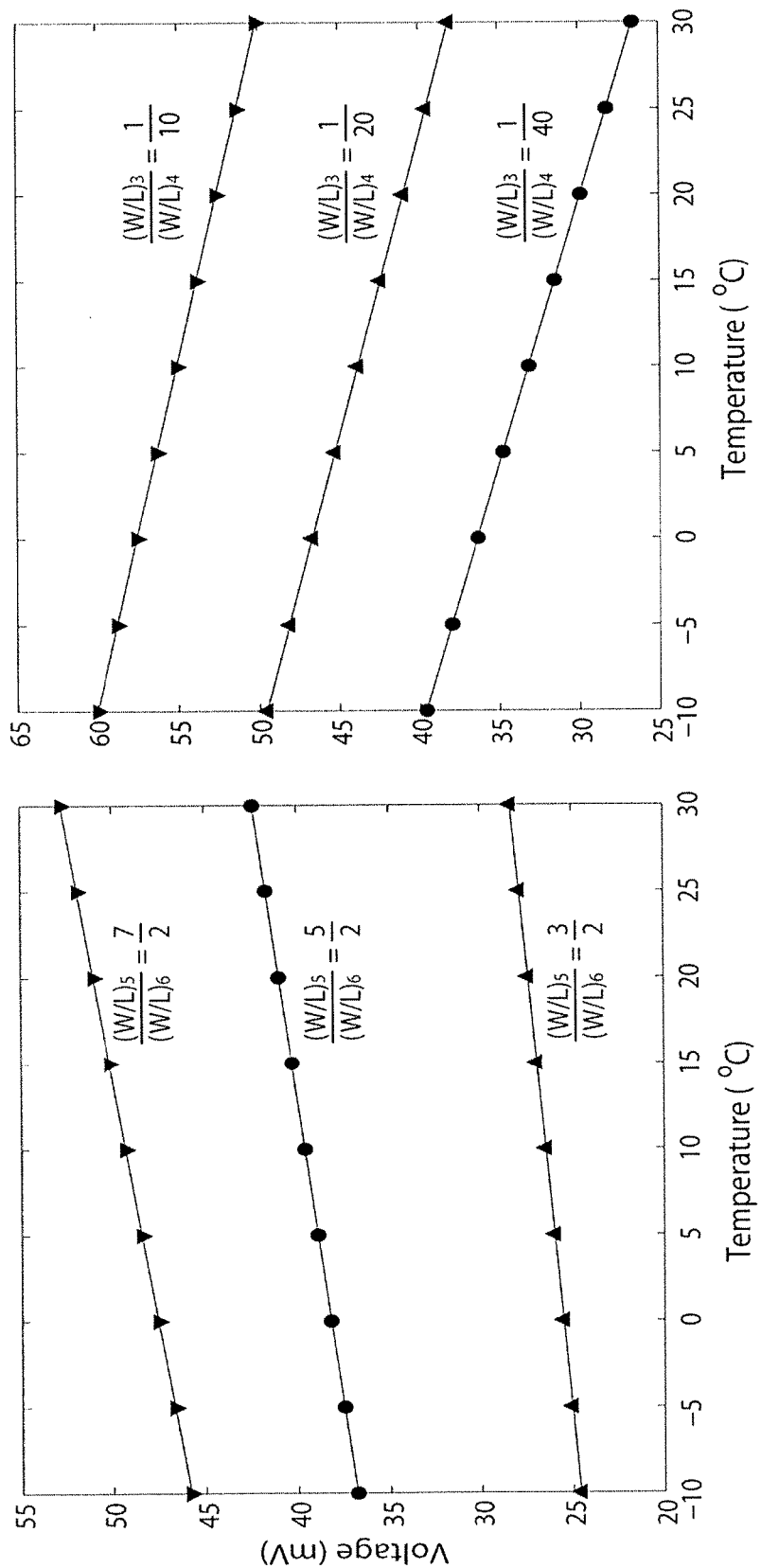
Figure 5:
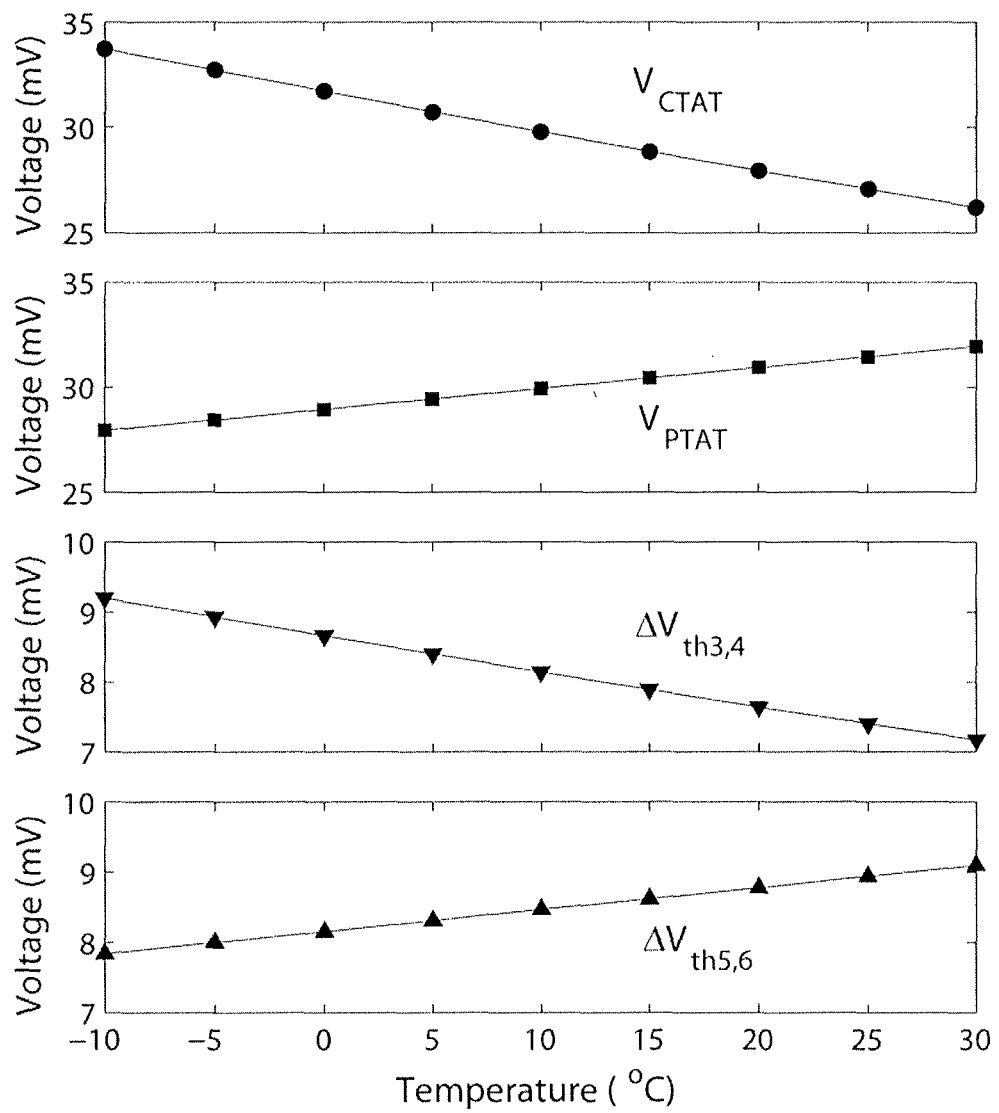
Figure 6:
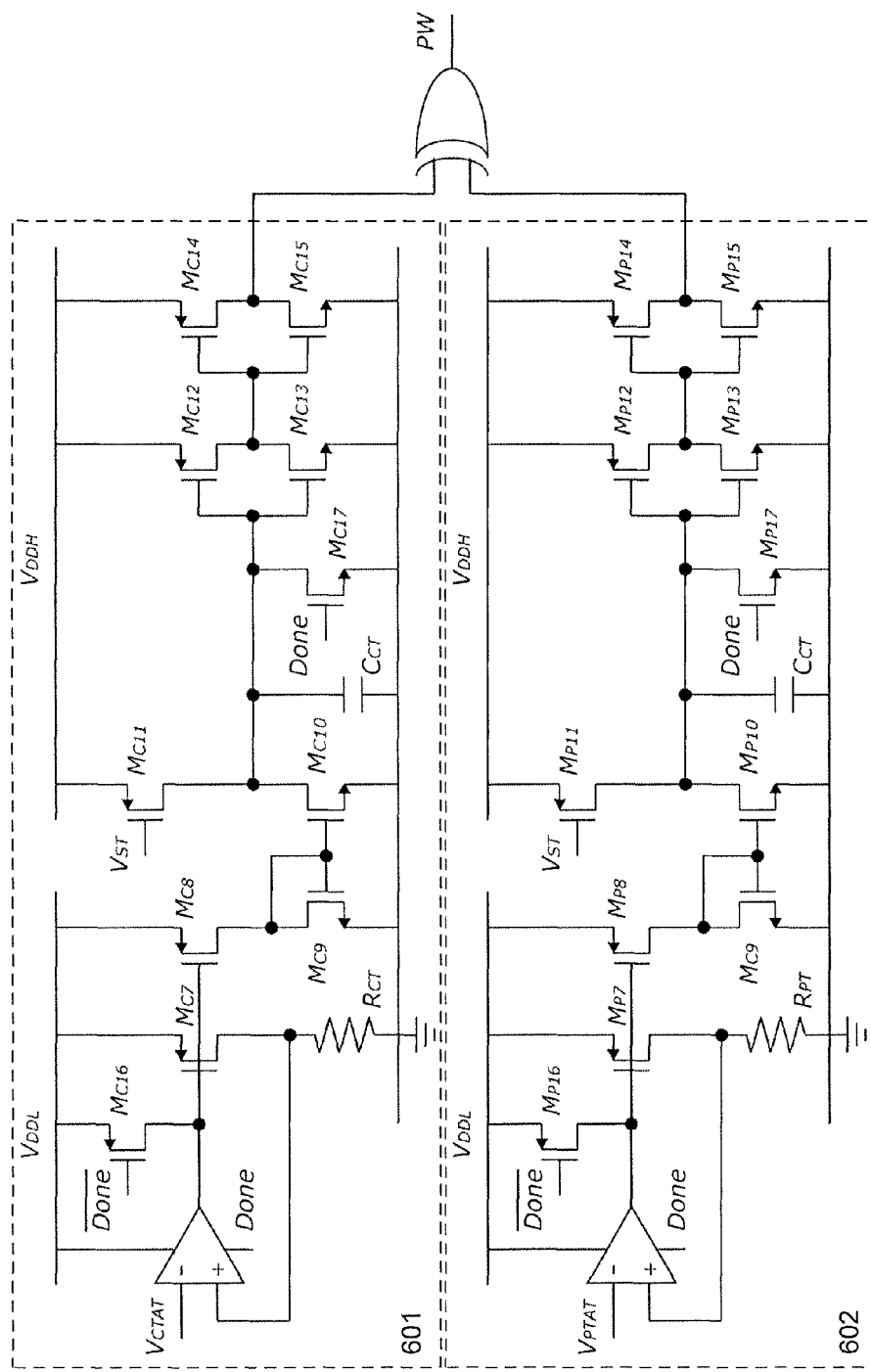
Figure 7:
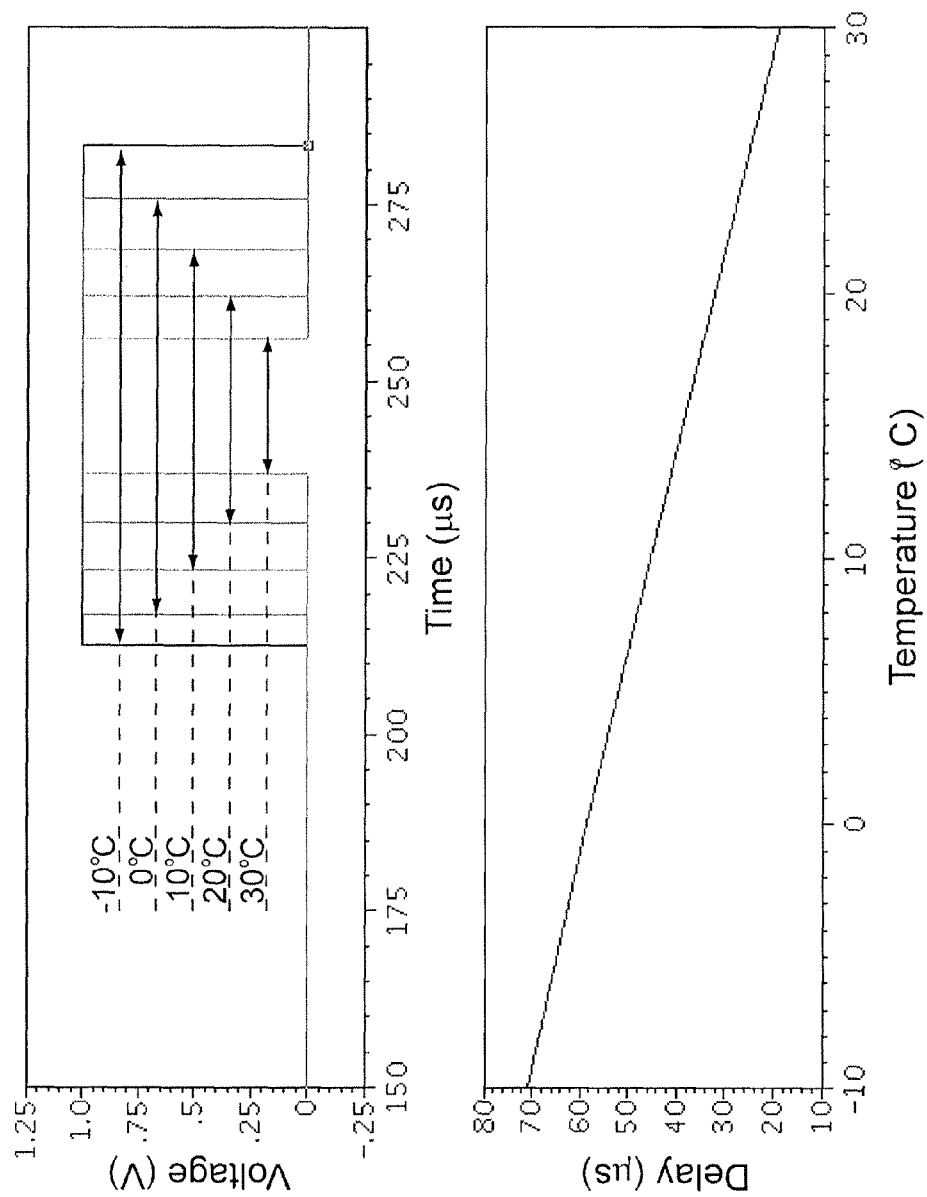
Figure 8:
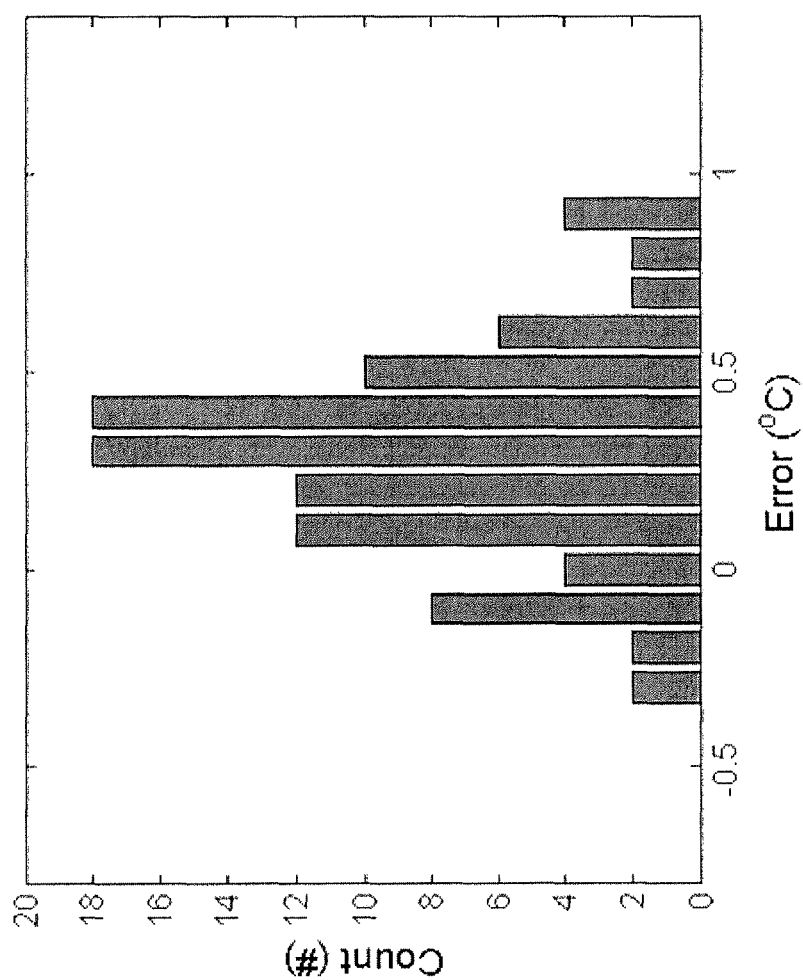
Figure 9:
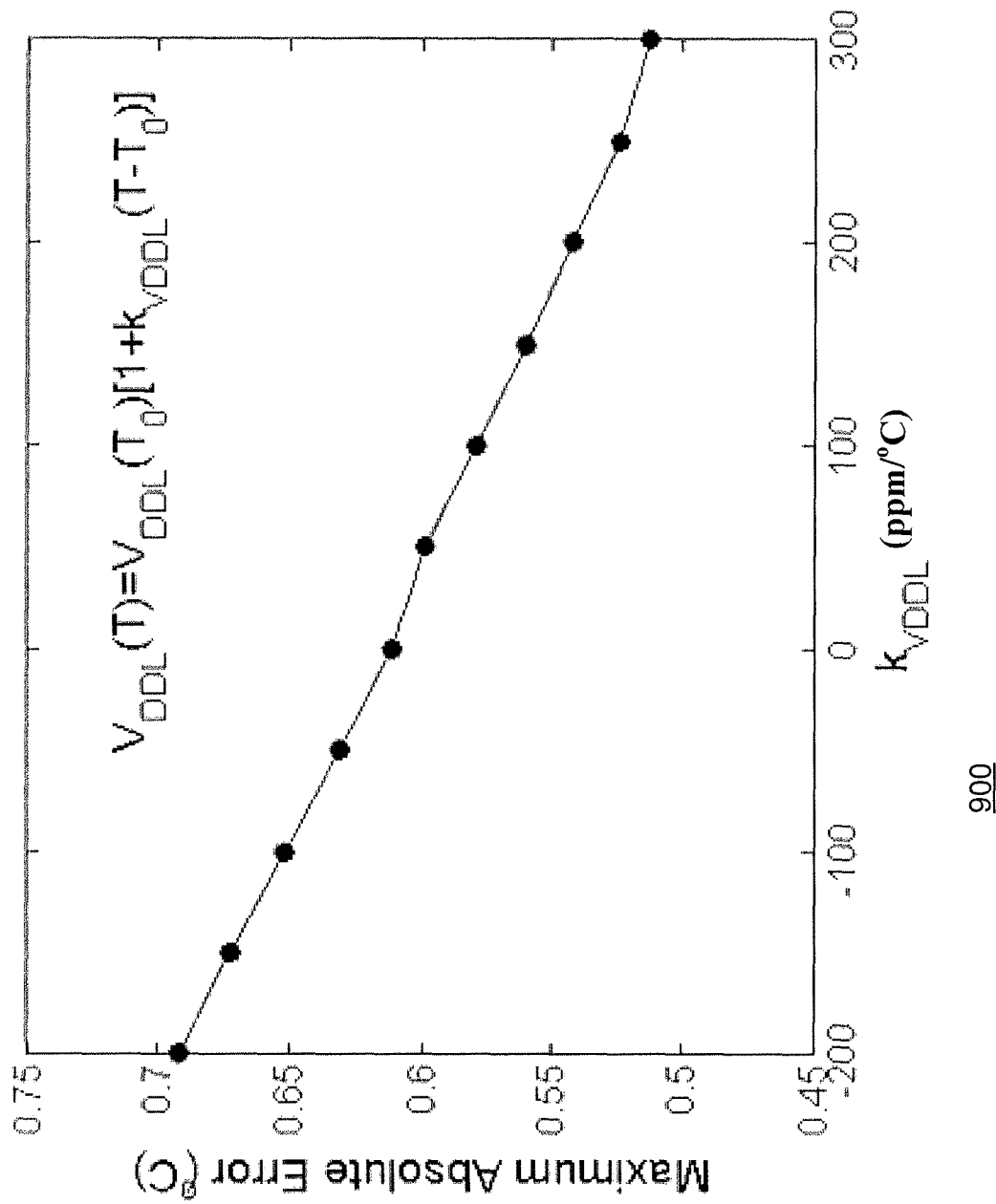
Figure 10:
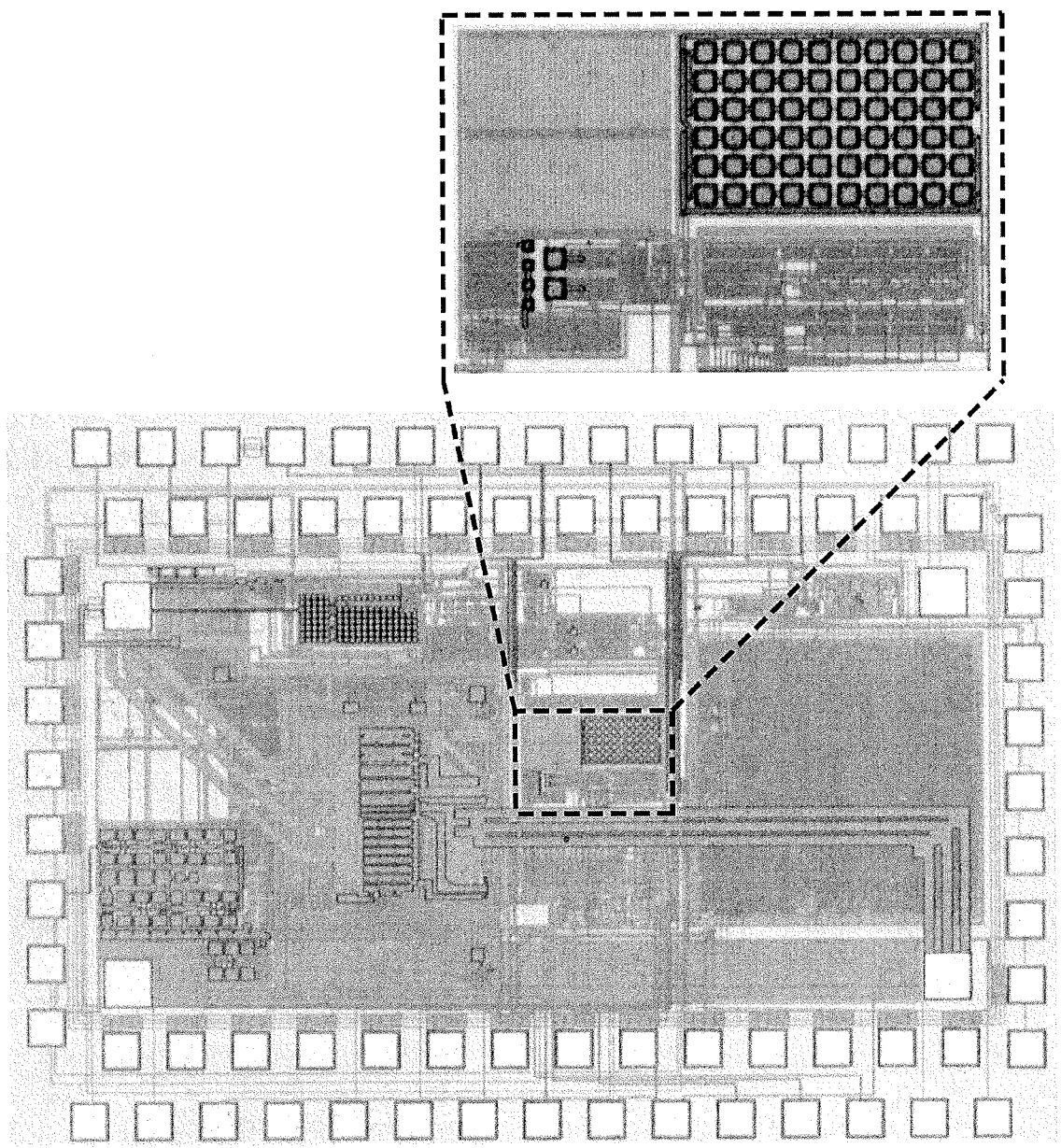
Figure 11:
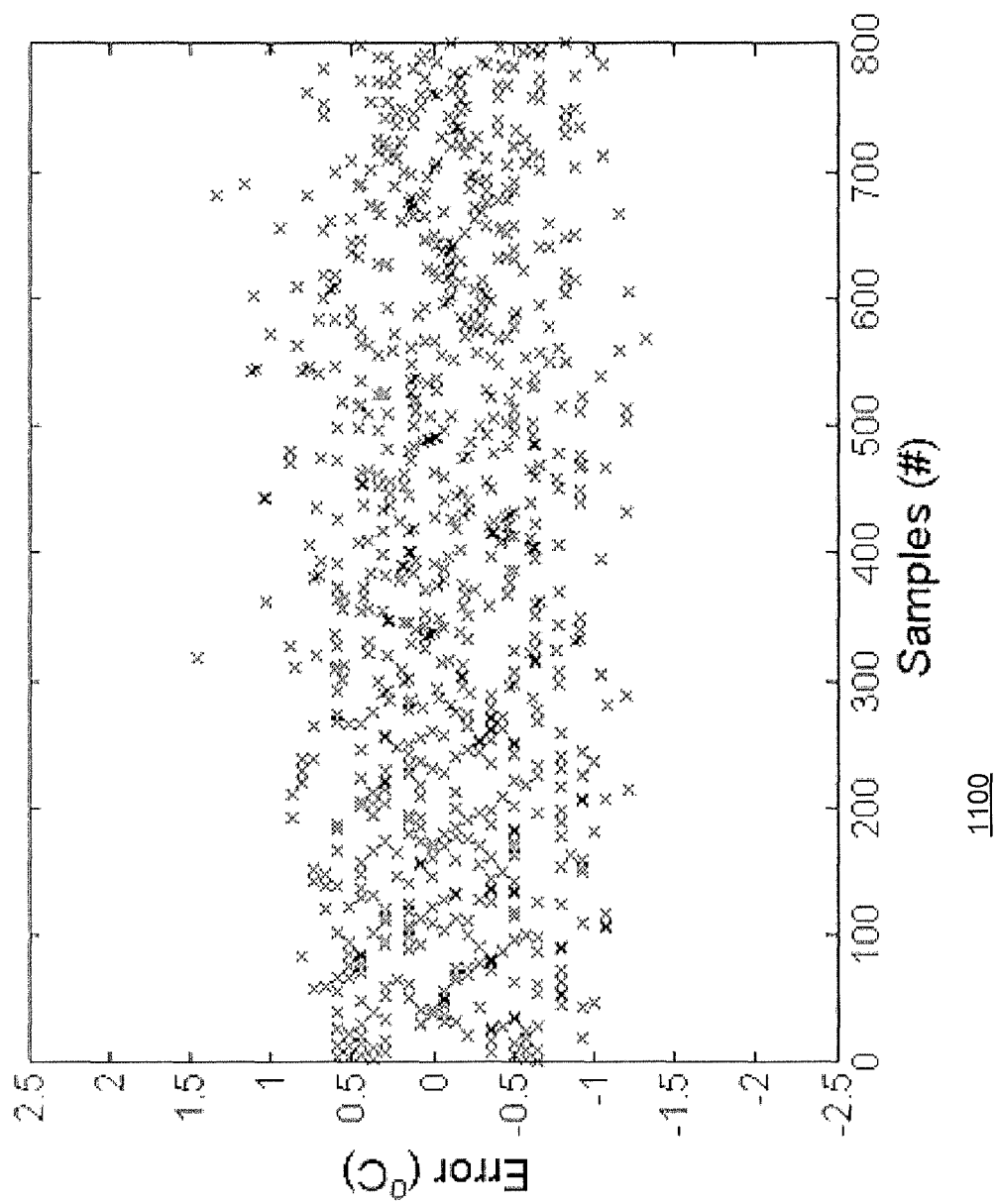
Figure 12:
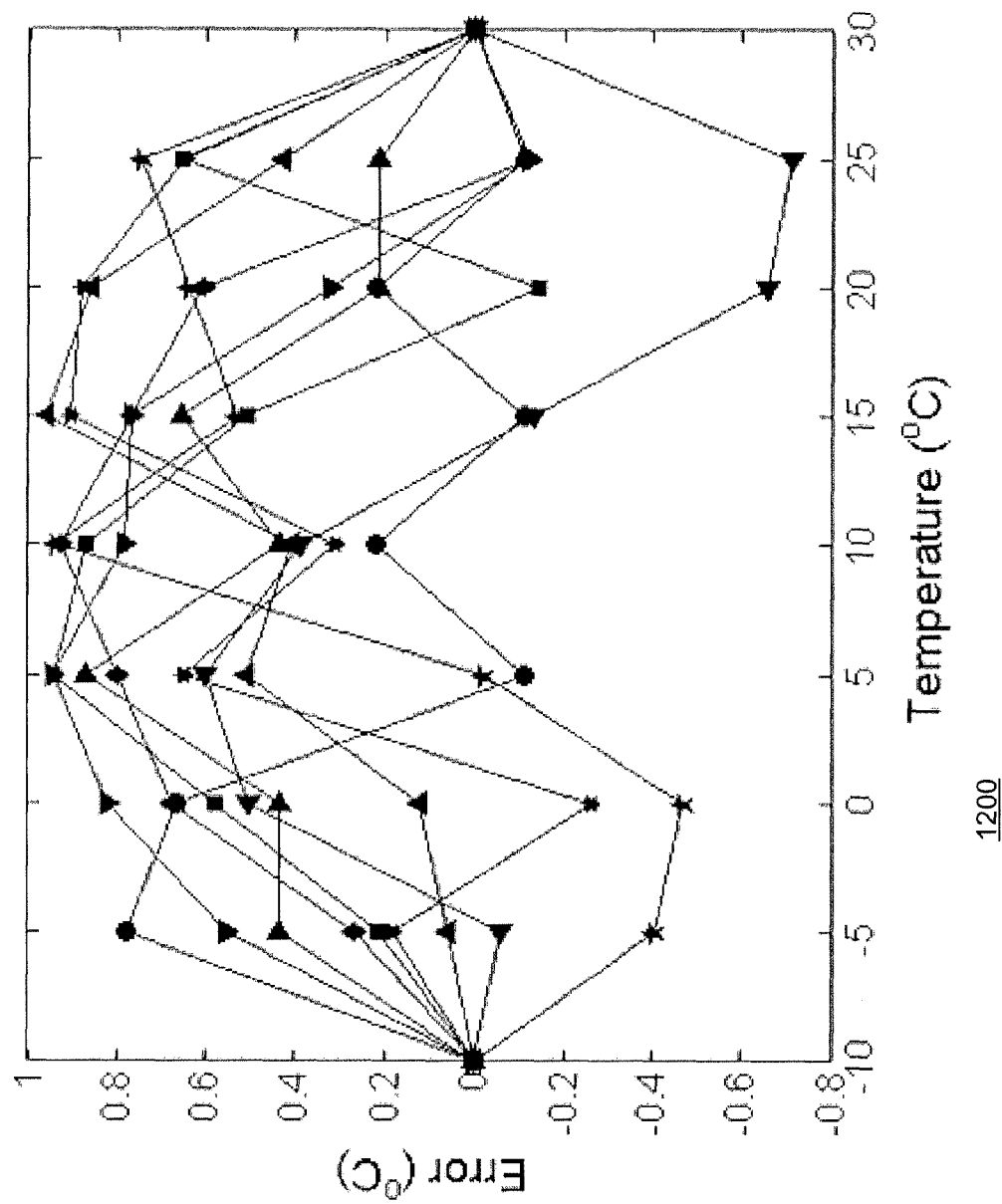
Figure 13:
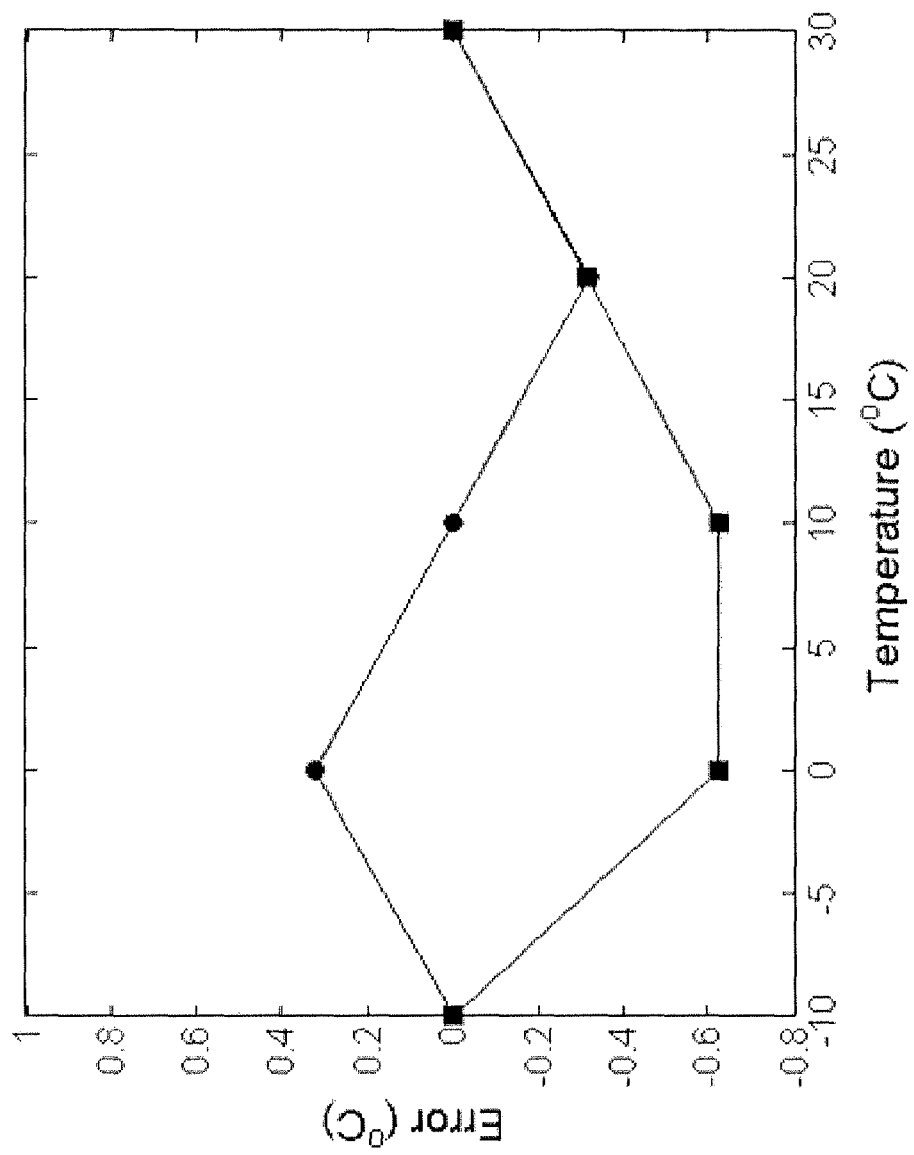
Figure 14:
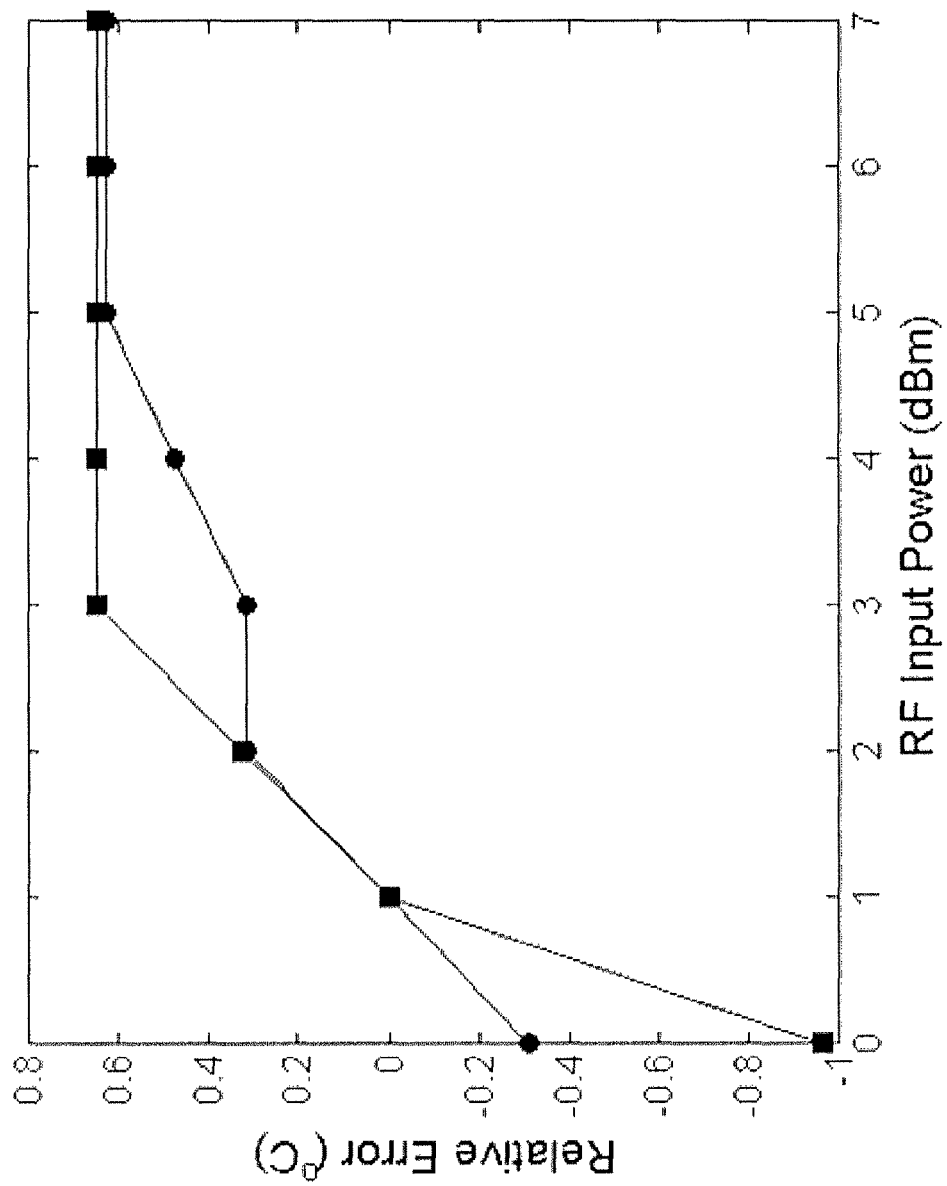

FIG. 4 contains graphs depicting Matlab simulation results for Eqs. (7) (left) and (8) (right) based on different transistor sizing ratios, with the term $(W/L)_1/(W/L)_2$ fixed to be 1/32 and $V_{DDL}$ set to 0.5;

FIG. 5 contains graphs depicting simulation results of the $V_{PTAT}$, $V_{CTAT}$, $\Delta V_{th3,4}$ and $\Delta V_{th5,6}$ dependence on temperature;

FIG. 6 is a circuit diagram depicting the configuration of exemplary CTAT and PTAT delay generators;

FIG. 7 contains graphs depicting simulated temperature modulated pulse width from −10° C. to 30° C. and delay as a function of temperature;

FIG. 8 is a graph depicting error due to non-linearity from −10° C. to 30° C. after calibration from 100 Monte-Carlo simulation runs (without considering variations for resistors and capacitors);

FIG. 9 is a graph depicting no nialized maximum absolute error after two-end-point calibration with $V_{DDL}$ having different temperature dependencies;

FIG. 10 is a chip micrograph depicting an exemplary complete RFID tag with embedded temperature sensor;

FIG. 11 is a graph depicting measured temperature inaccuracy (° C.) over 800 samples at 1 k samples/s from a single measured sample showing a 3σ error inaccuracy of +/−1.5° C.;

FIG. 12 is a graph depicting measured temperature inaccuracy (° C.) after averaging and two-end-point calibration from −10° C. to 30° C. for nine measured samples;

FIG. 13 is a graph depicting measured temperature inaccuracy (° C.) under system level measurement after two-end-point calibration from −10° C. to 30° C. for two measured samples; and FIG. 14 is a graph depicting measured temperature inaccuracy (° C.) over RF input power (dBm) over two measured samples.

DETAILED DESCRIPTION OF THE INVENTION

Figure 1:
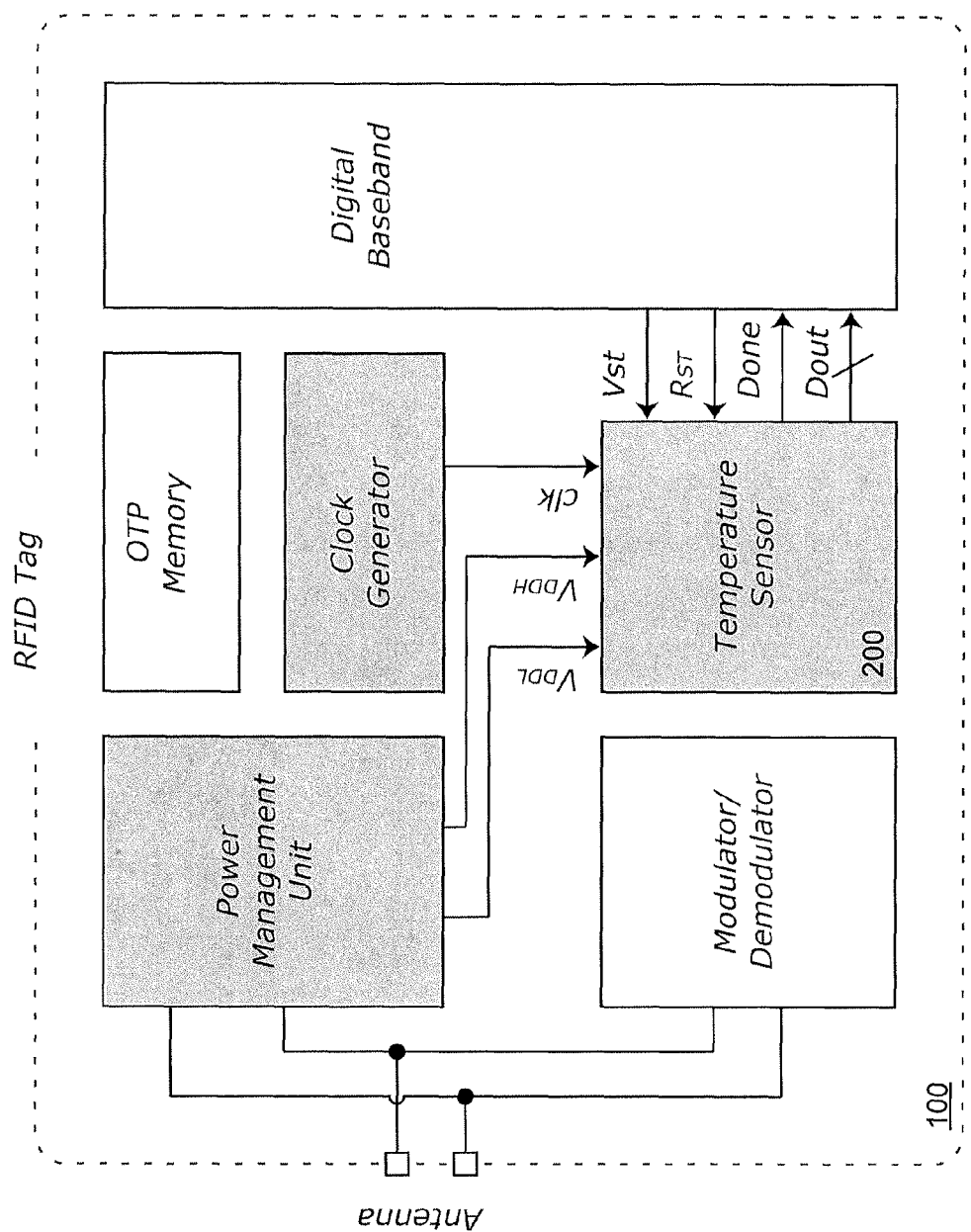
FIG. 1 is a block diagram depicting an exemplary RFID tag in which embodiments of the present invention may be implemented.

With reference to FIG. 1, a block diagram is depicted showing components of an RFID tag 100 that may be used with embodiments of the present invention. The RFID tag 100 generally includes an antenna, a power management unit (PMU), a modulator/demodulator, an OTP (one-time programmable) memory, a clock generator, a temperature sensor, and a digital baseband. The PMU rectifies incoming RF signals to generate supply voltages for the other building blocks, including the temperature sensor, and provides analog biasing and a power-on-reset (POR) signal for analog and digital modules, respectively. The clock generator produces the system clock for synchronization as well as sensor signal quantization. The modulator changes the tag's input impedance to control whether the incoming power from the reader is absorbed by the tag or reflected to the reader for tag data transmission, while the demodulator removes the carrier frequency to recover the data symbols. The digital baseband is utilized to decode the commands, perform the corresponding tasks and encode the required data and send back to the reader. The OTP memory may be used to store an EPC user ID and other information such as temperature data. The sensor supply voltages and the quantization clock may be provided by the power management unit and the clock generator, respectively. In one exemplary embodiment, temperature sensing operation may be activated when an EPC Gen2 compliant custom temperature sensing command—as described in "Protocol Requirements," EPC Radio-Frequency Identity Protocols Class-1 Generation-2 UHF RFID Protocol for Communications at 860 Mhz-960 MHz Version 1.0.9, pp 17-66, EPCGlobal, January 2005, which is incorporated herein by reference in its entirety—is received. The sensor may then use the rectified power and the system clock to perform sensing and quantization. Upon sensing completion, temperature data is sent back to a reader for further processing and storage through the antenna. It should be appreciated that the foregoing description simply provides a brief overview of one exemplary RFID tag 100 and that one skilled in the art will recognize that other configurations, including other RFID tag configurations as well as non-RFID tag configurations, not shown here may be used to implement the principles of the present invention as well.

Figure 2:
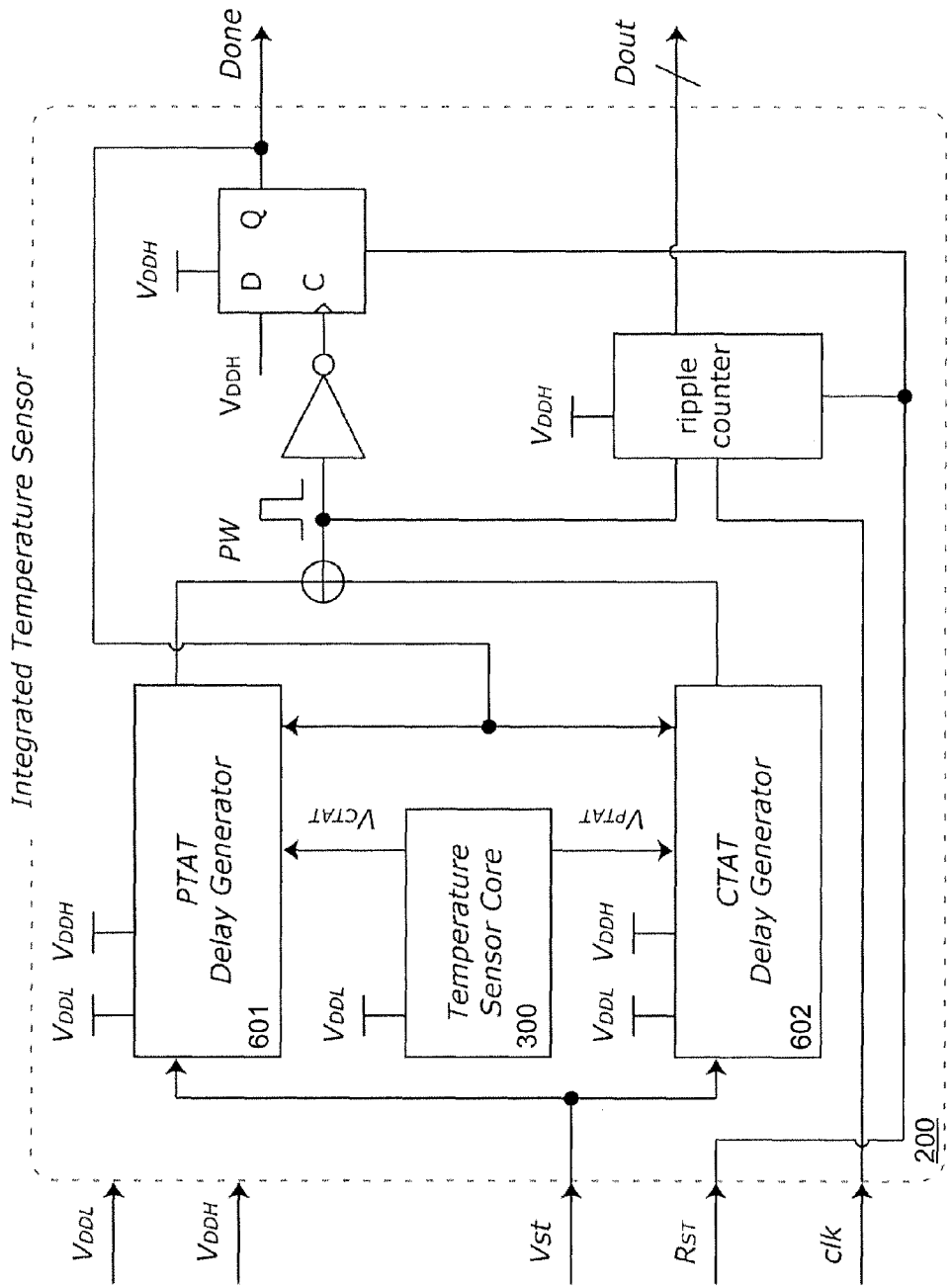
FIG. 2 is a block diagram depicting an exemplary integrated temperature sensor.

FIG. 2 is a block diagram corresponding to a temperature sensor 200 in the RFID tag 100 usable in embodiments of the present invention. The temperature sensor 200 generates $V_{PTAT}$ and $V_{CTAT}$ signals from a sensor core 300 that utilizes MOS devices operating in a subthreshold region. It will be appreciated that the subthreshold region refers to one of the three modes of operation of a MOS transistor, which includes subthreshold (a.k.a. cutoff or weak-inversion) mode where $V_{GS}<V_{th}$, linear (a.k.a. triode) mode where $V_{GS}>V_{th}$ and $V_{DS}<(V_{GS}-V_{th})$, and saturation (a.k.a. active) mode where $V_{GS}>V_{th}$ and $V_{DS}>(V_{GS}-V_{th})$.

$V_{PTAT}$ and $V_{CTAT}$ are temperature-dependent voltage signals are converted to delays through corresponding delay generators 601, 602. An XOR function is applied to the output signals of the delay generators, and the resultant temperature modulated output pulse PW, which is level-shifted to 1V for interfacing at the output of the delay generators, is further quantized using the clock signal at the ripple counter. The quantized temperature information Dout is sent to the digital baseband of FIG. 1, and the digital baseband may further process the temperature information for output to an RFID tag reader. It will be appreciated that this time-domain readout scheme utilizes ADCs which are not as power-hungry as conventional ADCs, which allows for a reduction of power consumption.

For system level implementations (in the context of the RFID tag 100), the sensor utilizes the existing supply voltages and clock signals available in the tag to further reduce power overhead and additionally reduce area overhead. The sensor supply voltages, $V_{DDL}$=0.5V and $V_{DDH}$=1V, may be provided by the on-chip power management unit depicted in FIG. 1. The supply voltages are provided by LDOs with filtering to reduce both noise at the RF frequency and the ripple voltage, as required by the sensor and other building blocks to ensure robust tag operation. The clock generator generates the system clock, and this clock is utilized by the sensor for quantization. This quantization clock is generated through injection locking. In that case, its frequency is referenced to the incident RF input and should be weakly dependent to both process and temperature variation. The sensor control signals are generated and the quantized temperature data received by the digital baseband. In order to further reduce power consumption, a Done signal is exerted at the end of each conversion period to shut-down the sensor core and delay generators and to acknowledge the baseband for triggering retrieval of the temperature sensing information and further processing tasks in the baseband. After processing by the baseband, the temperature data is then ready and can be read out by a reader.

Figure 3:
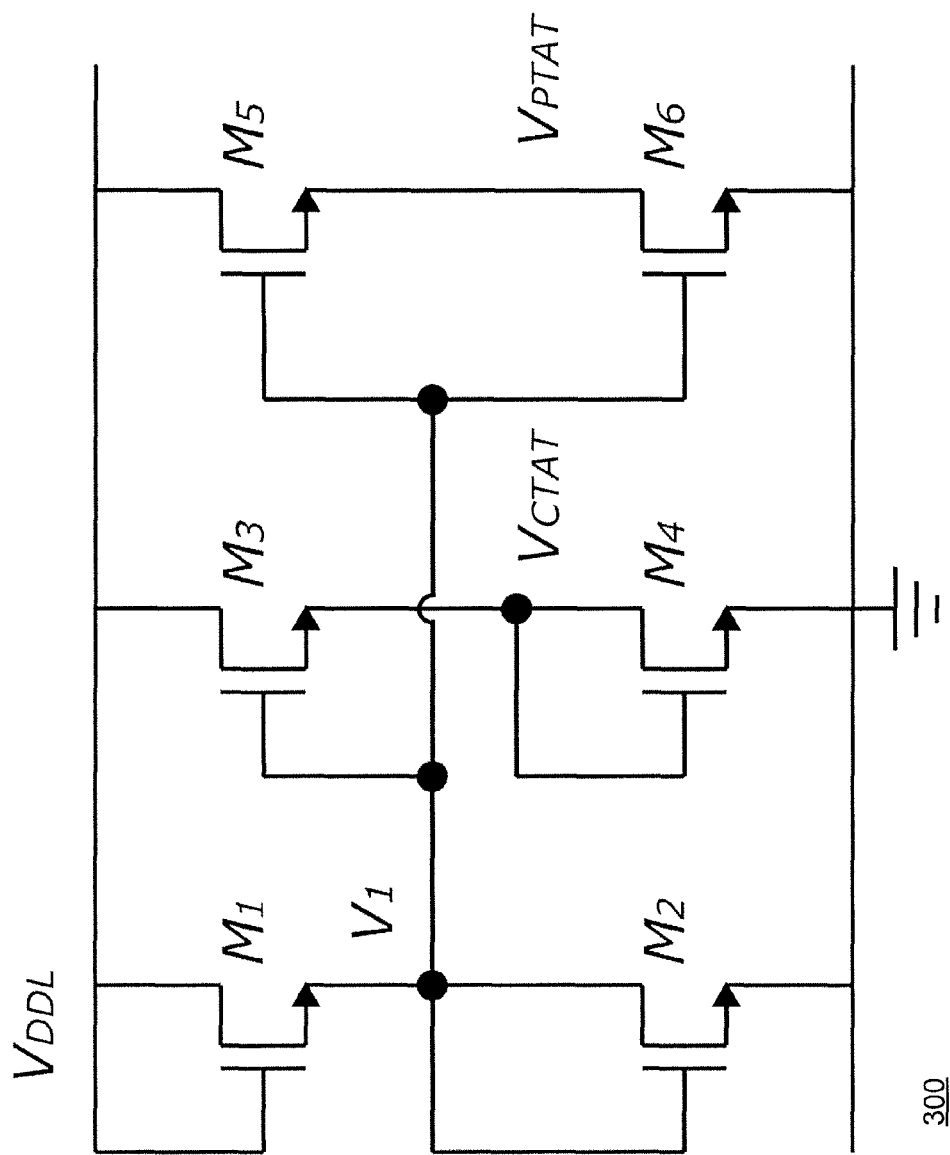
FIG. 3 is a circuit diagram depicting the configuration of an exemplary temperature sensor core.

FIG. 3 is a circuit diagram corresponding to a temperature sensing core 300 usable in embodiments of the present invention, comprised of serially connected MOS transistors operating in a sub-threshold region to generate $V_{PTAT}$ and $V_{CTAT}$ signals in order to achieve both low voltage and low power operation. MOS transistors $M_{1-2}$ provide proper biasing for the other MOS transistors $M_{3-6}$. For a MOS transistor operating in the sub-threshold region, the drain current can be deduced from the following equation:

$$I_{sub} = \mu C_{OX}\left(\frac{W}{L}\right)V_T^2 \exp\left(\frac{V_{gs} - V_{th}}{nV_T}\right)\left[1 - \exp\left(-\frac{V_{ds}}{V_T}\right)\right] \quad (1)$$

where μ is the mobility, $C_{OX}$ is the oxide capacitance, W/L is the transistor sizing, $V_T$ is the thermal voltage kT/q and $V_{th}$ is the transistor threshold voltage, respectively. Under the condition where $V_{ds}$>~$3V_T$, which occurs when $V_{ds}$ is at about 75 mV at room temperature, equation (1) can be reduced to:

$$I_{sub} \approx \mu C_{OX}\left(\frac{W}{L}\right)V_T^2 \exp\left(\frac{V_{gs} - V_{th}}{nV_T}\right) \quad (2)$$

According to certain embodiments of the present invention, the transistors may be biased such that $V_{PTAT}$ ($V_{ds6}$) and $V_{CTAT}$ ($V_{ds4}$) are both smaller than $3V_T$ so that the resistor may be reduced by more than half in the subsequent V-I conversion stage (see discussion below regarding the delay generators) for the same power budget.

Using Eqs. (1) and (2), to determine the value $V_{PTAT}$ shown in FIG. 3, equating $I_{D5}$=$I_{D6}$ yields the following equation:

$$\mu C_{OX}\left(\frac{W}{L}\right)_5 V_T^2 \exp\left(\frac{V_1 - V_{PTAT} - V_{th5}}{nV_T}\right) \approx \quad (3)$$
$$\mu C_{OX}\left(\frac{W}{L}\right)_6 V_T^2 \exp\left(\frac{V_1 - V_{th6}}{nV_T}\right)\left[1 - \exp\left(-\frac{V_{PTAT}}{V_T}\right)\right] \Rightarrow$$
$$V_{PTAT} + nV_T \ln\left(1 - \exp\left(-\frac{V_{PTAT}}{V_T}\right)\right) \approx nV_T \ln\frac{(W/L)_5}{(W/L)_6} - \Delta V_{th5,6}$$

Assuming the term $|\exp(-V_{PTAT}/V_T)|$ is much smaller than one (so that it can be approximated by the Taylor series using only the first order term), Eq. (3) can be reduced to:

$$V_{PTAT} \approx nV_T\left(\ln\frac{(W/L)_5}{(W/L)_6} + \exp\left(-\frac{V_{PTAT}}{V_T}\right)\right) - \Delta V_{th5,6} \quad (4)$$

where $\Delta V_{th}$ is the difference in threshold voltages due to body effect. Similarly, if we equate $I_{D1}$=$I_{D2}$ and $I_{D3}$=$I_{D4}$, the voltages $V_1$ and $V_{CTAT}$ as shown in FIG. 3 can be expressed as:

$$V_1 \approx \frac{1}{2}\left(nV_T \ln\frac{(W/L)_1}{(W/L)_2} - \Delta V_{th1,2} + V_{DDL}\right) \quad (5)$$

$$V_{CTAT} \approx \frac{1}{2}\left(nV_T\left(\ln\frac{(W/L)_3}{(W/L)_4} + \exp\left(-\frac{V_{CTAT}}{V_T}\right)\right) - \Delta V_{th3,4} + V_1\right) \quad (6)$$

For simplicity, it may initially be assumed that there is no body effect. Utilizing the Lambert-W function (which is typically used to solve equations involving exponentials)—as described in Corless et al, "On the Lambert-W Function," Advances in Computational Mathematics, vol. 5, pp. 329-359, 1996, which is incorporated herein by reference in its entirety—to solve for $V_{PTAT}$, Eq. (4) can be further reduced to:

$$V_{PTAT} \approx V_T\left[n\ln\frac{(W/L)_5}{(W/L)_6} + G\left(n \cdot \exp\left(-n\ln\frac{(W/L)_5}{(W/L)_6}\right)\right)\right] \quad (7)$$

where G(.) is the Lambert-W function. For now, it may further be assumed that $V_{DDL}$ has negligible temperature dependency (the variability of $V_{DDL}$ with respect to process is discussed further below with respect to process variation). Thus, Eqs. (5) and (6) can be reduced to:

$$V_{CTAT} \approx \frac{V_{DDL}}{4} + V_T\left(\frac{n\ln(K)}{4} + G\left(\frac{n}{2}\exp\left(-\frac{1}{4}\left(\frac{V_{DDL}}{V_T} + n\ln(K)\right)\right)\right)\right) \quad (8)$$

where $$K = \left(\frac{(W/L)_3}{(W/L)_4}\right)^2\left(\frac{(W/L)_1}{(W/L)_2}\right) \quad (9)$$

FIG. 4 shows Matlab simulation results 400 for $V_{PTAT}$ (left) and $V_{CTAT}$ (right) signals based on Eqs. (7), (8) and (9) and various transistor sizing ratios for $M_5$ and $M_6$ (left) and $M_3$ and $M_4$ (right), given a fixed ratio of 1/32 between transistors M1 and M2 (i.e., (W/L)$_1$/(W/L)$_2$=1/32) and $V_{DDL}$ of 0.5 V. From this simulation, it can seen that the resultant PTAT and CTAT voltages may achieve high linearity over the targeted sensing range, and their temperature dependencies can be adjusted by varying the corresponding transistor sizing. In particular, $V_{PTAT}$ can be designed to have positive temperature dependency by properly sizing the transistor width of $M_5$ to be larger than $M_6$. Similarly, $V_{CTAT}$ can be designed to have negative temperature dependency by properly sizing the transistors $M_{1-4}$, with the width of $M_2$ and $M_4$ larger than $M_1$ and $M_3$, respectively. Also, it can be seen that the existence of a temperature dependent term $V_T$ inside the Lambert-W function in Eq. (8) can affect the linearity of $C_{CTAT}$ with respect to temperature. In that case, instead of having a temperature independent $V_{DDL}$, better linearity in $V_{CTAT}$ can be achieved if $V_{DDL}$ is slightly positively temperature dependent, so as to cancel out the effect of the $V_T$ term inside the Lambert-W function in Eq. (8). This was confirmed by the results discussed below with respect to process variation and $V_{DDL}$. It will be appreciated that the length L of transistors should be the same in order to achieve better matching and precision analog layout.

Now, taking the body effect into account, from the BSIM3v3 model, the threshold voltage of MOS transistor can be expressed as:

$$V_{th}(T) = V_{th}(T_0) + \left(K_{T1} + \frac{K_{t11}}{L_{eff}}\right)\left(\frac{T}{T_0} - 1\right) + K_{T2}V_{bseff}\left(\frac{T}{T_0} - 1\right) \quad (10)$$

where $K_{T1}$, $K_{t11}$ and $K_{T2}$ are process dependent parameters and $L_{eff}$ and $V_{bseff}$ are the effective channel length and body-source voltage, respectively. Considering the difference of threshold voltages (assuming the transistor lengths are matched), the first two terms can be cancelled out, leaving only a $V_{bs}$ dependent term. Taking into account that the lower transistors $M_2$, $M_4$ and $M_6$ of FIG. 3 are connected to ground and hence have zero $V_{bs}$, the following equation can be deduced:

$$\Delta V_{th}(T) = K_{T2}V_{bseff}\left(\frac{T}{T_0} - 1\right) \quad (11)$$

From Eq. (11), it can be seen that $\Delta V_{th}$ is dependent on $V_{bseff}$, which corresponds to the $V_{PTAT}$ and $V_{CTAT}$ signals. The temperature dependency of $\Delta V_{th}$ is scaled by the factor $K_{T2}$, which approximately equals −0.03 in this process. In order to verify how body effect affects $V_{PTAT}$ and $V_{CTAT}$, simulations of the sensor core were performed using the transistor sizing as shown in Table I below.

TABLE I

Summary of transistor sizes, resistor and capacitor values.

| Transistor | W/L (µm/µm) |
|---|---|
| M1 | 2 u/360 n |
| M2 | 32*2 u/360 n |
| M3 | 4*2 u/360 n |
| M4 | 160*2 u/360 n |
| M5 | 50*2 u/2.88 u |
| M6 | 20*2 u/2.88 u |

| Resistor | kΩ |
|---|---|
| $R_{CT}$ | 222.84 |
| $R_{PT}$ | 311.89 |

| Capacitor | pF |
|---|---|
| $C_{CT}$ | 3.36 |
| $C_{PT}$ | 3.36 |

FIG. 5 contains graphs 500 showing simulated waveforms for $V_{PTAT}$, $V_{CTAT}$, $\Delta V_{th3,4}$ and $\Delta V_{th5,6}$ ($\Delta V_{1,2}$ is similar to $\Delta V_{th3,4}$ and thus is not shown) based on temperature. It can be seen from FIG. 5 that both the $V_{PTAT}$ and $V_{CTAT}$ signals can be generated with good linearity with respect to temperature over the targeted sensing range, and are clearly exhibiting the same temperature dependency as compared to $\Delta V_{th5,6}$ and $\Delta V_{th3,4}$, respectively. This can also be deduced from Eqs. (4), (5) and (6), considering the fact that the $\Delta V_{th}$ signals have a linear response to temperature as shown in FIG. 5.

P. Chen, C. Chen, C. Tsai and W. Lu, "A Time-to-Digital-Converter-Based CMOS Smart Temperature Sensor," IEEE Journal of Solid-State Circuits, vol. 40, no. 8, pp. 1642-48, August 2005 (hereinafter "Chen et al."), which is incorporated herein by reference in its entirety, describes the use of two delay lines for a time-domain CMOS temperature sensor. By introducing a second reference delay line, the offset introduced by the first temperature modulated delay line can be canceled. However, the addition of the second delay line will also increase the output noise power without contributing to the overall signal, as one of the delay lines used by Chen et al. is only for the generation of a reference signal. A differential sensing architecture employing two delay lines where both delay lines generate temperature-dependent signals to achieve better SNR is described by M. K. Law and A. Bermak, "A Time Domain differential CMOS Temperature Sensor with Reduced Supply Sensitivity," IEEE International Symposium on Circuits and Systems, May 2008, pp. 2126-2129, which is incorporated herein by reference in its entirety, and M. K. Law and A. Bermak, "A 405-nW CMOS Temperature Sensor Based on Linear MOS Operation," IEEE Trans. on Circuits and Systems II, vol. 56, no. 12, December 2009, pp. 891-895, which is incorporated herein by reference in its entirety.

Embodiments of the present invention utilize the principles relating to differential sensing architecture described by Law and Bermak in the two articles cited above and incorporate PTAT and CTAT delay lines, which allows for cancelling the signal offset without sacrificing the sensor output SNR. In these embodiments, even though the noise power is increased due to the addition of a second delay line, the signal power is also increased to compensate for the loss. However, it will be appreciated that, given the novel temperature sensor core design in embodiments of the present invention, the differential sensing architecture is different from those described in the Law and Bermak articles above. For example, it will be appreciated that, in embodiments of the present invention, the PTAT and CTAT delay generators accept two temperature-dependent voltage signals ($V_{PTAT}$ and $V_{CTAT}$) from the temperature sensor core, and the criterion of Eq. (17) below should be fulfilled to achieve good linearity. It will further be appreciated that a lower operating voltage is sufficient, less power is consumed, and the two delay paths are better matched and allow for relatively greater predictability with respect to temperature sensing performance.

FIG. 6 is a circuit diagram 600 corresponding to PTAT 601 and CTAT 602 delay generators usable in embodiments of the present invention. The PTAT and CTAT delay generators convert the temperature modulated signal from the voltage domain to the time domain for simple and power efficient processing. Without loss of generality (i.e. the principles described with respect to the CTAT delay generator 602 are also applicable to the PTAT delay generator 601), the CTAT delay generator 602 is considered first. Transistors $M_{P7-8}$, together with the resistor $R_{PT}$ and the amplifier, convert the input voltage $V_{PTAT}$ into current $I_{CTAT}$. Low voltage operation is sustained by implementing the amplifier using a simple current mirror architecture. Stacking of transistors is avoided by having the amplifier output directly driving $M_{P7}$. The scaled current from $M_{P8}$ is mirrored through $M_{P9-10}$. Transistors $M_{P10-15}$ operate as a single-slope ADC, which also performs level-shifting from 0.5V to 1V for interfacing with other digital circuits. Similarly, the PTAT delay generator 601 converts $V_{CTAT}$ into $I_{CTAT}$, followed by another single-slope ADC.

At the start of each integration cycle, the signal $V_{ST}$ is exerted, shutting down $M_{P11}$ and $M_{C11}$. The temperature modulated current signals (which are converted from $V_{PTAT}$ or $V_{CTAT}$) are integrated through capacitors $C_{PT}$ and $C_{CT}$.

Upon reaching the switching threshold of $M_{P12-13}$ and $M_{C12-13}$, rising edges are triggered and buffered by $M_{P14-15}$ and $M_{C14-15}$. As the discharging currents are temperature dependent, the delay between the two rising edges is also temperature dependent. The two rising edge signals from the CTAT and PTAT delay paths are XORed to generate a temperature modulated pulse width PW and then further quantized using the ripple counter and the system clock of FIG. 2. The sensor core and the delay generators are then shut-down through the feedback Done signal, which also indicates the end of conversion.

As mentioned before, two rising edges are generated at the outputs of individual delay generator. Because $V_{CTAT}$ and $V_{PTAT}$ are both linearly dependent to temperature, $I_{CTAT}=V_{CTAT}/R_{CT}$ and $I_{PTAT}=V_{PTAT}/R_{PT}$ should also be linearly dependent to temperature (assume the temperature dependency of resistors is negligible). It may be assumed that, at a particular temperature T and reference temperature $T_0$:

$$I_{PTAT}(T)=I_{PTAT}(T_0)[1+k_P(T-T_0)] \quad (12)$$

$$I_{CTAT}(T)=I_{CTAT}(T_0)[1-k_C(T-T_0)] \quad (13)$$

where $k_P$ and $k_C$ are constants corresponding to the temperature dependency of $V_{PTAT}$ and $V_{CTAT}$, respectively. Without loss of generality, the case of the PTAT delay generator is considered. The temperature dependent $I_{CTAT}$, which is generated from $V_{CTAT}$ of the sensor core in FIG. 3, is utilized to discharge the integrating capacitor ($C_{PT}=C_{CT}=C$). The PTAT delay generated can be determined by the following equation:

$$t_{PTAT}(T) = \frac{C\Delta V}{I_{CTAT}(T)} \quad (14)$$

where $\Delta V$ is the difference between $V_{DDH}$ and the threshold crossing determined by the corresponding transistors $M_{C12-13}$ in the PTAT delay generator in FIG. 6.

By using Eq. (13), Eq. (14) may be approximated as:

$$t_{PTAT}(T) \approx \frac{C\Delta V}{I_{CTAT}(T_0)}\left(1 + k_C(T-T_0) + k_C^2(T-T_0)^2\right) \quad (15)$$

Similarly, the CTAT delay generated can be expressed as:

$$t_{CTAT}(T) \approx \frac{C\Delta V}{I_{PTAT}(T_0)}\left(1 - k_P(T-T_0) + k_P^2(T-T_0)^2\right) \quad (16)$$

For Eqs. (15) and (16) to be valid, both $k_C(T-T_0)$ and $k_P(T-T_0)$ have to be sufficiently small such that the effect of the higher order terms can be neglected. In order to achieve this, the transistors may be sized to obtain corresponding $k_C$ and $k_P$ as shown in FIG. 5. In one exemplary embodiment, the terms $k_C$ and $k_P$ were approximately equal to 5.1 m/° C. and 3.7 m/° C., respectively.

Assuming that the capacitor C and the threshold crossings are matched between the two delay generators, the second order terms of Eqs. (15) and (16) can be cancelled if the following condition holds:

$$k_P^2 I_{CTAT}(T_0)=k_C^2 I_{PTAT}(T_0) \quad (17)$$

which may be accomplished by designing the circuit accordingly. After cancelling the second order term, the temperature modulated signal PW at the output of the XOR gate may be expressed as:

$$t_{PW}(T) \approx \left(\frac{C\Delta V}{I_{CTAT}(T_0)} - \frac{C\Delta V}{I_{PTAT}(T_0)}\right) + \left(\frac{C\Delta V k_C}{I_{CTAT}(T_0)} - \frac{C\Delta V k_P}{I_{PTAT}(T_0)}\right)(T-T_0) \quad (18)$$

Eq. (18) verifies that even though the outputs of individual delay generators are non-linear, as predicted in Eqs. (15) and (16), the resultant delay at the output of the XOR gate can still be linear. Additionally, the coefficient of the temperature dependent term is increased (as $k_C$ is negative), meaning that the signal power is increased through differential sensing.

FIG. 7 contains graphs 700 showing the simulated pulse width PW arising from temperatures of −10° C. to 30° C. in increments of 10° C. (top), and the simulated delay as a function of temperature (bottom). The nominal values for $I_{CTAT}$ and $I_{PTAT}$ at room temperature are 10.9 nA and 12.5 nA, respectively. With an increase in temperature, the output PW signal is reduced at both rising and falling edges through the use of the differential sensing architecture (i.e. shorter output pulses with higher temperature, as shown by the top graph), and the resultant temperature dependency of $t_{PW}$ is linear (shown by the bottom graph).

Up to this point, the discussion above has focused on simulated results, but in practice, the linearity of the sensor is affected by mismatch between the two signal paths. Apart from the errors introduced by transistors $M_{1-6}$ and amplifier offsets, resistors and capacitors used for V-I conversion and signal integration are also susceptible to process variation and mismatch. On-chip resistors and capacitors values can have a variation of up to +/−10 to 15%. The effect that possible variations may have on sensor performance may be studied using Eq. (18).

As both resistors are matched, $I_{CTAT}$ and $I_{PTAT}$ vary with high correlation. Thus, the variation in resistors and capacitors will not significantly degrade the $t_{PW}$ linearity. Instead, this will only affect the effective resolution of the sensor response. FIG. 8 is a graph 800 depicting Monte-Carlo simulation results (100 runs) of the sensor error due to nonlinearity from −10° C. to 30° C. after two-end-point calibration (where the sensing inaccuracy is calibrated at −10° C. and 30° C. by mapping the digital output with a known temperature) and without considering variations in resistors/capacitors. The resultant sensor error over the targeted sensing range was found to be +0.9/−0.3° C. In order to estimate the effect on the sensor performance due to resistor/capacitor variation, additional Monte-Carlo simulations were performed with different resistor and capacitor process corners. In particular, three separate Monte-Carlo simulations were performed where, in each simulation, one of the three corner models (SS, TT, FF) for resistor and capacitor was chosen. Combining the results of the three simulations yielded a set of data which includes the corner variations of resistors and capacitors. These simulation results showed that taking resistor/capacitor variation into account increased the sensor error to +1.4/−0.4° C. over the specified temperature range after calibration.

As mentioned above, the accuracy of Eqs. (15) and (16) rely on both $k_C(T-T_0)$ and $k_P(T-T_0)$ being sufficiently small. For a broader temperature sensing range, these assumptions become more inaccurate, which degrades the linearity of $t_{PW}$ with respect to temperature. The targeted sensing range is 40° C. (from −10 to 30° C.), but if the temperature sensing range is broadened from 40° C. to 60° C. (from −10 to 50° C.), the sensor inaccuracy due to non-linearity increases from +0.9/−0.3° C. to +1.1/−0.8° C. (without considering resistors and capacitors variations) after calibration.

Additionally, the supply voltage may also vary due to process variation, and the on-chip implementation of LDO accuracy, which is limited by the on-chip bandgap, can have up to a 4-5% part to part variation. Due to this variation, it is possible for the resultant supply voltage to become either under or over-compensated, resulting in a characteristic of either PTAT or CTAT. As indicated in Eq. (8), the signal $V_{CTAT}$ is dependent on $V_{DDL}$. The temperature dependency of $V_{CTAT}$ is based on a combination of the transistor sizing and $V_{DDL}$. As a consequence, changes in $V_{DDL}$ due to process variation and mismatch can affect the sensor performance. As discussed above with respect to the temperature sensing core, the linearity of $V_{CTAT}$ degrades when $V_{DDL}$ is CTAT, and improves when $V_{DDL}$ is PTAT.

FIG. 9 is a graph 900 showing a normalized maximum absolute error after two-end-point calibration for a sensor with $V_{DDL}$ having different temperature dependencies. In embodiments of the present invention, $V_{DDL}$ typically exhibits PTAT behavior of about 50 ppm/° C. within the targeted sensing range. The nominal value for $V_{DDL}$ is 500 mV, and thus the change in $V_{DDL}$ between $-10$ to $30°$ C. ($40°$ C. range) should be about 1 mV ($50 \times 10^{-6}/°$ C. $\times 40°$ C. $\times 500 \times 10^{-3}$ V). The bounds in FIG. 9 are set to reflect an approximately $+/-5\%$ error in $V_{DDL}$ due to process variation. It can be observed that the error due to linearity improves if $V_{DDL}$ exhibits a PTAT behavior, and the worst case increase in error when compared with the typical case (50 ppm/° C.) is approximately $0.1°$ C. Thus, the increase in sensor error due to variation in $V_{DDL}$ is expected to be small after calibration.

In one exemplary embodiment, a temperature sensor is fabricated utilizing a standard CMOS 0.18 μm 1P6M process. As shown in the chip micrograph 1000 in FIG. 10, the sensor occupies a small active area, which in this case was 0.0416 mm². Extensive matching for reducing errors may be exercised during the layout design stage in order to minimize the effects of process variation and mismatch (see Table I above for transistor sizing in the sensor core).

Power consumption was measured at room temperature using an Agilent 3458A multimeter. With supply voltages at 0.5V and 1V and a conversion rate of 1 k samples/s, the sensor dissipated a measured power of 119 nW (74 nW from 0.5V supply and 45 nW from 1V supply). From simulation, the power consumption breakdown for the sensor core, delay generators and digital circuitry are 17 nW, 55 nW and 25 nW, respectively.

In order to characterize the performance of the temperature sensor with respect to accuracy, measurements were performed inside the temperature chamber THS-A KSON Instrument Technology, with a temperature step of 5° C. within the specified temperature range from $-10°$ C. to $30°$ C. In a first measurement setup, in order to fully characterize the sensor, the Agilent Modular Logic Analysis System 16902B was used to generate the required control signals as well as analyze the sensor outputs. The output pulse was quantized using an external clock. Calibration was performed by using simple straight line fitting between the results at two end temperature points as described in Chen et al. at page 1647 (full citation above). With $N_{Tmin}$ and $N_{Tmax}$ representing the digital outputs at minimum and maximum temperatures in the targeted sensing range, which are $-10$ and $30°$ C., respectively, the effective resolution is defined as $(T_{max}-T_{min})/(N_{Tmin}-N_{Tmax})$. The sensor performance can then be obtained by comparing the interpolated value and the measured output.

FIG. 11 is a graph 1100 showing the measured temperature error over the measured output samples at 1 k samples/s. It was observed that the $3\sigma$ error, which is mainly contributed to by readout noise, can be up to $\pm 1.5°$ C. In order to improve the measured accuracy, a lower conversion rate may be used so as to minimize the readout noise, and measured data may be averaged at every 30 samples. FIG. 12 is a graph 1200 showing the resultant temperature error of nine different chips produced according to the principles described in this embodiment, in the targeted sensing range of $-10°$ C. to $30°$ C., after two-end-point calibration. With a temperature step of $5°$ C., the measured temperature error after averaging (over 30 samples) was found to be within $+1/-0.8°$ C. Due to process variation, the effective resolution varied from chip to chip, ranging from 0.14 to $0.21°$ C./LSB over the nine measured samples.

The supply voltages and the system clock, which may be provided by the overall RFID tag, are major factors that determine the sensor performance. Thus, embedded sensor performance was also tested within the RFID tag system to evaluate overall system performance, where the power is supplied by the power management block and the injection-locked reference clock is supplied by the clock generator block of FIG. 1. Similar to the measurements conducted above with respect to the temperature sensor itself, this test was also performed inside the temperature chamber, but with the external inputs changed to an input RF signal using an Agilent E4433B RF signal generator. Two samples were fully characterized experimentally and the measurement results are shown in FIG. 13. From the graph 1300 of FIG. 13, it can be seen that the measured sensor inaccuracy is still well within the temperature inaccuracy range of $+1/-0.8°$ C. obtained from the standalone sensor test of nine samples described above, verifying the performance of the sensor within the RFID tag system. However, if more samples are tested, a larger inaccuracy range is likely to be observed over the targeted temperature sensing range.

FIG. 14 is a graph 1400 showing the error induced by variations in the RF input power based on two measured samples. At low RF input powers, the sensor performance is degraded, mainly due to the fact that there is not enough power available for the building blocks and thus the supply voltages from the power management unit are not provided at their nominal values. A nominal power of 1 dBm is required to power up the system to its designed operating condition. This is due to the fact that there is impedance mismatch between the Agilent E4433B output and the tag input, and power is lost due to reflection. With an input RF power below 0 dBm, the sensor fails to function due to a lack of power, which is thus the minimum input power for the embedded sensor to function. By further increasing the RF input power past 1 dBm, the sensor error changes until it saturates, upon which the sensor error stops increasing with further increases in RF input power. It can be seen from FIG. 14 that the sensor inaccuracy over the operating range due to varying input power, when compared to its nominal operating condition at 1 dBm, is within $+0.71-1°$ C. over the two measured samples.

Table II below compares the performance of the temperature sensor in this embodiment of the present invention with other low power MOS-based temperature sensor designs recently reported in scientific literature.

TABLE II

Performance comparison of recently published low power CMOS temperature sensors.

| Sensor | Supply voltage (V) | Error (° C.) | Area (mm²) | Temp. Range (° C.) | Power Consumption | Sampling Rate | Technology |
|---|---|---|---|---|---|---|---|
| [1] | 3.3 | +0.9/−0.7 | 0.175 | 0~100 | 10 µW | 2 | 0.35 µm |
| [2] | N/A | +2.2/−1.8[#] | N/A | 0~100 | 9.6 µW[#] | 2 | N/A |
| [3] | 2 | +/−2.4[#] | 0.03[#] | −10~80 | 1.6 µW | N/A | 0.35 µm |
| [4] | 1 | +3/−1.6 | 0.0495 | 0~100 | 0.22 µW | 100 | 0.18 µm |
| Invention | 0.5, 1 | +1/−0.8 | 0.0416 | −10~30 | 0.119 µW[##] | 33 | 0.18 µm |

Note:
All errors indicated are not 3σ bounds.
[#]Estimated data from the corresponding literature.
[##]Excluding the power for generating the supply and clock.
[1] P. Chen, C. Chen, C. Tsai and W. Lu, "A Time-to-Digital-Converter-Based CMOS Smart Temperature Sensor," IEEE Journal of Solid-State Circuits, vol. 40, no. 8, August 2005.
[2] K. Opasjumruskit et al, "Self-powered Wireless Temperature Sensor Exploit RFID Technology," IEEE Pervasive Computing, vol. 5, issue 1, pp. 54-61, January-March 2006.
[3] N. Cho et al, "A 5.1 uW UHF RFID Tag Chip integrated with Sensors for Wireless Environmental Monitoring," European Solid-State Circuits Conference, pp. 279-282, September 2005.
[4] Y. Lin, D. Sylvester and D. Blaauw, "An Ultra Low Power 1 V, 220 nW Temperature Sensor for Passive Wireless Applications," IEEE Custom Integrated Circuits Conference, pp. 507-510, September 2008.

However, it will be appreciated that the comparison of different temperature sensors is not straightforward as, typically, the target performance is different for different designs, and therefore circuit complexities and specifications may vary significantly. In addition, some designs rely on externally powered control signals, which are not relevant to our application since all signals are generated internally for a passive RFID tag. Some other implementations only focus on the precision and temperature range while little attention is given to power consumption.

With respect to the present invention, since the energy available within the passive RFID tag is very limited, the focus is mainly emphasized on power consumption while trying to maintain reasonable accuracy, temperature range and sampling frequency. For this reason, the comparison in Table II, specifically with respect to references [2]-[4], highlights recent designs where the main aim was low power consumption in connection with wireless sensing applications. As can be seen from Table II, an embodiment of the present invention is able to achieve significantly lower power consumption while maintaining a relatively good degree of measured inaccuracy over the targeted temperature sensing range. The area occupied by the sensor in this embodiment is also small enough to be embedded on RFID tags, where cost is an important consideration.

It will thus be appreciated that the present invention provides for an ultra low power CMOS temperature sensor with power consumption shown to be as low as 119 nW (excluding the power consumed by generating the supply and clock) at room temperature, especially suitable in RFID food monitoring applications. Temperature sensing is performed through $V_{PTAT}$ and $V_{CTAT}$ signals generated from serially connected MOS transistors operating in sub-threshold region. As a consequence, supply voltages as low as 0.5V can be used, allowing reduction of power consumption overhead, which is one of the major concerns in embedded sensors for passive wireless applications. Differential sensing architecture is utilized so as to cancel the signal offset as well as increase the effective temperature signal power. Measurement results at both the block level and system level show that a temperature inaccuracy of +1/−0.8° C. can be achieved at 33 samples/s within a target temperature range from −10° C. to 30° C. Furthermore, temperature sensing may be fully performed within a passive tag, where power is harvested from an RF source, due to the ultra low power feature of the inventive design. Moreover, the small silicon area required (0.0416 mm² in one embodiment) makes it suitable for RFID applications, where cost is of primary importance.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating a temperature sensor including a temperature sensor core circuit having serially connected metal-oxide-semiconductor (MOS) transistors connected to an input for receiving a supply voltage and a ground, the method comprising:
    applying a voltage to the serially connected MOS transistors so that each of the MOS transistors operates in a subthreshold region; and
    generating at least one temperature-dependent voltage signal from the temperature sensor core circuit while operating the plurality of serially connected MOS transistors in the subthreshold region.

2. The method of claim 1, wherein the received supply voltage is approximately 0.5 V or less.

3. The method of claim 1, wherein two temperature-dependent voltage signals $V_{CTAT}$ and $V_{PTAT}$ are generated, corresponding to an input voltage for a proportional-to-absolute-temperature (PTAT) delay generator circuit and an input voltage for a complementary-to-absolute-temperature (CTAT) delay generator circuit, respectively.

4. The method of claim 1, further comprising:
    converting the at least one temperature-dependent voltage signal into a voltage pulse, wherein the length of the voltage pulse in the time domain is temperature-dependent.

5. The method of claim 3, further comprising:
    converting the two temperature-dependent voltage signals $V_{CTAT}$ and $V_{PTAT}$ into a voltage pulse, wherein the length of the voltage pulse in the time domain is temperature-dependent by inputting $V_{CTAT}$ into a PTAT delay generator circuit and inputting $V_{PTAT}$ into a CTAT delay generator circuit and performing an XOR operation on the outputs of the PTAT and CTAT delay generator circuits.

6. The method of claim 5, further comprising:
    quantizing the voltage pulse into a temperature value based on the length of the voltage pulse in the time domain.

7. The method of claim 5, further comprising:
    shutting down the PTAT and CTAT delay generator circuits through a feedback signal after the conversion to a voltage pulse is complete.

8. The method of claim 5, wherein the power dissipated by the temperature sensor during temperature measurement is approximately equal to 119 nW.

9. A temperature sensor circuit comprising:
    a sensor core circuit for outputting at least one temperature-dependent voltage signal, the sensor core circuit further comprising:
        a plurality of serially connected metal-oxide-semiconductor (MOS) transistors connected to an input for receiving a supply voltage, wherein the drain of at least one MOS transistor is connected to the source of at least one other MOS transistor; and
        a ground connected to the source of the at least one MOS transistor;
        wherein operation of the plurality of serially connected MOS transistors in a subthreshold region is adapted to generate at least one temperature-dependent voltage signal at a node corresponding to the connection between the drain of one MOS transistor and the source of another MOS transistor.

10. The temperature sensor circuit of claim 9, wherein the plurality of serially connected MOS transistors are arranged as pairs of MOS transistors, wherein the drains of a first transistor in each of first, second and third pairs of MOS transistors are connected to the input for receiving a supply voltage and the sources of a second transistor in each of the first, second and third pairs of MOS transistors are connected to the ground.

11. The temperature sensor circuit of claim 10, wherein the width-to-length ratio of the second transistors are larger than the width-to-length ratios of the first transistors in the first and second pairs of MOS transistors, and wherein the width-to-length ratio of the first transistor is larger than the width-to-length ratio of the second transistor in the third pair of MOS transistors.

12. The temperature sensor circuit of claim 11, wherein a voltage at a node corresponding to the connection between the source of the first transistor and the drain of the second transistor in the second pair of MOS transistors is a temperature-dependent voltage $V_{CTAT}$, corresponding to an input voltage for a proportional-to-absolute-temperature (PTAT) delay generator circuit, and a voltage at a node corresponding to the connection between the source of the first transistor and the drain of the second transistor in the third pair of MOS transistors is a temperature-dependent voltage $V_{PTAT}$, corresponding to an input voltage for a complementary-to-absolute-temperature (CTAT) delay generator circuit.

13. The temperature sensor circuit of claim 10, wherein a node between the source of the first transistor and the drain of the second transistor in the first pair of MOS transistors provides the gate for the first transistor of the second pair of MOS transistors and the gates for both the first and second transistors of the third pair of MOS transistors.

14. The temperature sensor circuit of claim 9, further comprising
    a proportional-to-absolute-temperature (PTAT) delay generator circuit; and
    a complementary-to-absolute-temperature (CTAT) delay generator circuit,
    wherein the operation of the plurality of serially connected MOS transistors in a subthreshold region is adapted to generate two temperature-dependent voltage signals $V_{CTAT}$ and $V_{PTAT}$, corresponding to an input voltage for the PTAT delay generator circuit and an input voltage for a CTAT delay generator circuit, respectively.

15. The temperature sensor circuit of claim 14, further comprising,
    a time-to-digital differential readout circuit for converting the outputs of the PTAT delay generator circuit and the CTAT delay generator circuit into quantized temperature information.

16. The temperature sensor circuit of claim 15, wherein the time-to-digital differential readout circuit further comprises:
    a XOR gate for performing an XOR operation on the outputs of the PTAT delay generator circuit and the CTAT delay generator circuit to generate a voltage pulse, wherein the length of the voltage pulse in the time domain is temperature-dependent; and
    a ripple counter for outputting a Dout signal including quantized temperature information.

17. The temperature sensor circuit of claim 16, wherein the ripple counter uses a system clock provided by an radiofrequency identification (RFID) tag as an input for quantization.

18. A radiofrequency identification (RFID) tag comprising:
    a temperature sensor for temperature sensing, comprising a sensor core circuit for outputting at least one temperature-dependent voltage signal, the sensor core circuit further comprising:
        a plurality of serially connected metal-oxide-semiconductor (MOS) transistors connected to an input for receiving a supply voltage, wherein the drain of at least one MOS transistor is connected to the source of at least one other MOS transistor; and a ground connected to the source of the at least one MOS transistor;

wherein operation of the plurality of serially connected MOS transistors in a subthreshold region is adapted to generate the at least one temperature-dependent voltage at a node corresponding to the connection between the drain of one MOS transistor and the source of another MOS transistor;

a power management unit for providing a supply voltage to the temperature sensor such that the serially connected MOS transistors operate in a subthreshold region;

a clock generator for supplying a quantization clock signal to the temperature sensor;

a digital baseband for processing a quantized output signal from the temperature sensor containing temperature information; and an antenna for transmitting the temperature information to an RFID reader.

19. The RFID tag of claim 18, wherein the temperature sensor further comprises:

a complementary-to-absolute-temperature (CTAT) delay generator for receiving a $V_{PTAT}$ signal from the sensor core circuit;

a proportional-to-absolute-temperature (PTAT) delay generator for receiving a $V_{CTAT}$ signal from the sensor core circuit; and a time-to-digital differential readout circuit for converting outputs of the PTAT delay generator circuit and the CTAT delay generator circuit into quantized temperature information, wherein $V_{PTAT}$ and $V_{CTAT}$ are temperature-dependent voltages generated by the sensor core circuit.

20. The RFID tag of claim 18, wherein the source of the supply voltage provided by the power management utility are incoming radiofrequency (RF) signals provided to the RFID tag by the RFID reader.

\* \* \* \* \*